United States Patent [19]

Sakai et al.

[11] Patent Number: 5,563,711
[45] Date of Patent: Oct. 8, 1996

[54] IMAGE PROCESSING SYSTEM CAPABLE OF PROCESSING DIFFERENT TYPES OF INFORMATION

[75] Inventors: Masanori Sakai, Yokohama; Takayuki Komine, Fussa; Tetsuya Onishi; Toshihiro Kadowaki, both of Yokohama, all of Japan

[73] Assignee: Canon Kabushiki Kaisha, Tokyo, Japan

[21] Appl. No.: 445,551

[22] Filed: May 22, 1995

Related U.S. Application Data

[63] Continuation of Ser. No. 87,344, Jul. 1, 1993, abandoned, which is a continuation of Ser. No. 946,021, Sep. 17, 1992, abandoned, which is a continuation of Ser. No. 636,436, Dec. 31, 1990, abandoned.

[30] Foreign Application Priority Data

Dec. 29, 1989 [JP] Japan ..................... 1-341092

[51] Int. Cl.⁶ .................. H04N 1/21; H04N 1/40; H04N 1/00; H04M 11/00
[52] U.S. Cl. .................. 358/296; 358/401; 358/444; 379/100
[58] Field of Search .................. 358/296, 300, 358/401, 434, 444, 468; 379/67, 100

[56] References Cited

U.S. PATENT DOCUMENTS

| 4,432,020 | 2/1984 | Onose et al. .................... 358/434 |
| 4,893,333 | 1/1990 | Baran et al. ..................... 379/100 |
| 4,893,730 | 1/1990 | Baran et al. ..................... 379/100 |
| 4,916,266 | 4/1990 | Hashimoto ....................... 379/100 |
| 4,916,730 | 4/1990 | Hashimoto ....................... 379/100 |
| 4,922,524 | 5/1990 | Baba et al. ...................... 379/100 |
| 4,932,048 | 6/1990 | Kenmochi et al. ............. 379/100 X |
| 4,967,266 | 4/1990 | Yamamoto ........................ 358/76 |
| 4,989,238 | 1/1991 | Iggulden et al. ............. 358/444 X |
| 5,159,624 | 10/1992 | Makita ........................ 379/100 X |
| 5,170,266 | 12/1992 | Marsh et al. .................... 358/468 |
| 5,200,836 | 4/1993 | Koizumi ........................ 358/434 X |

FOREIGN PATENT DOCUMENTS

| 0245904 | 11/1987 | European Pat. Off. . |
| 60-206388 | 10/1985 | Japan . |
| 61-023677 | 1/1987 | Japan . |
| 63-080676 | 4/1988 | Japan . |

*Primary Examiner*—Peter S. Wong
*Assistant Examiner*—Eric Frahm
*Attorney, Agent, or Firm*—Fitzpatrick, Cella, Harper & Scinto

[57] ABSTRACT

An image processing system capable of processing different types of information includes a reproducing device for reproducing information stored in a medium. Discrimination apparatus discriminates whether the information reproduced by the reproducing device is image information or another type of information which is different from image information. Then, a conversion device converts data which indicates an attribution of the another type of information into image information when the discrimination apparatus determines that the information is the another type of information. Preferably, the discrimination apparatus can discriminate between image information, voice information, and digital information.

31 Claims, 27 Drawing Sheets

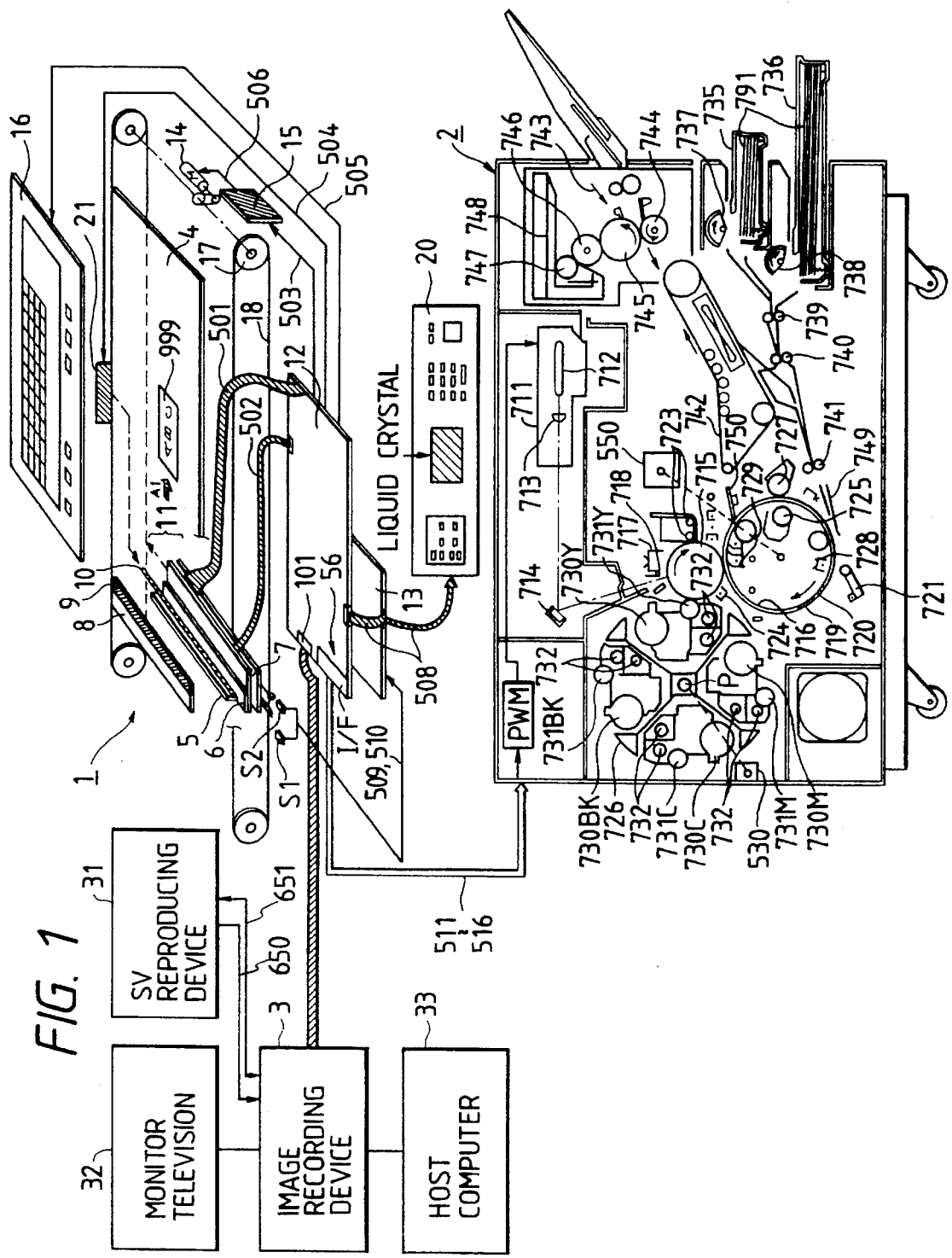

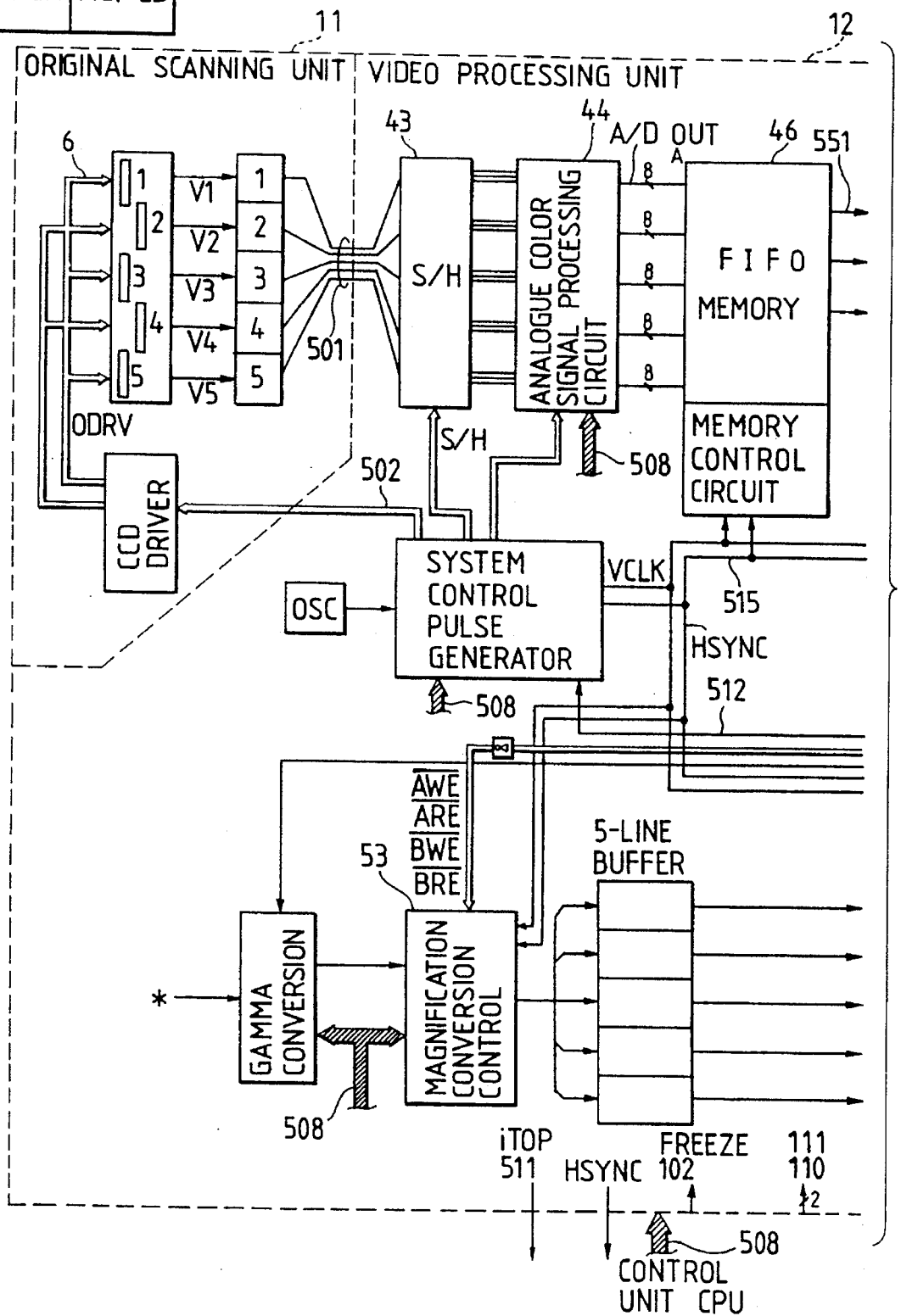

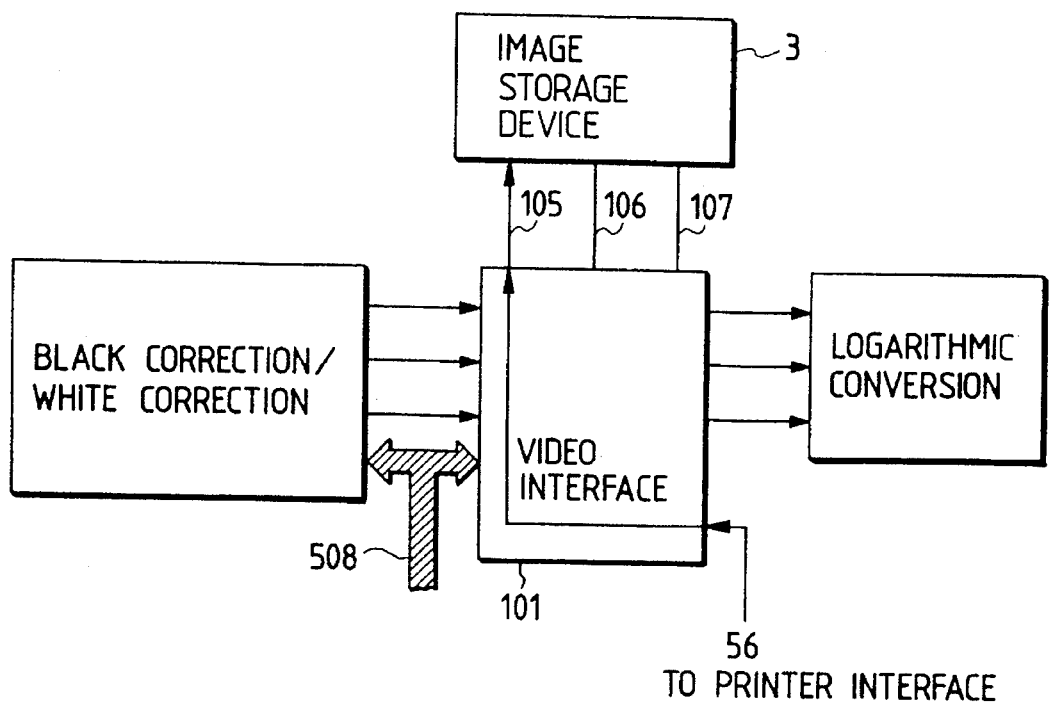
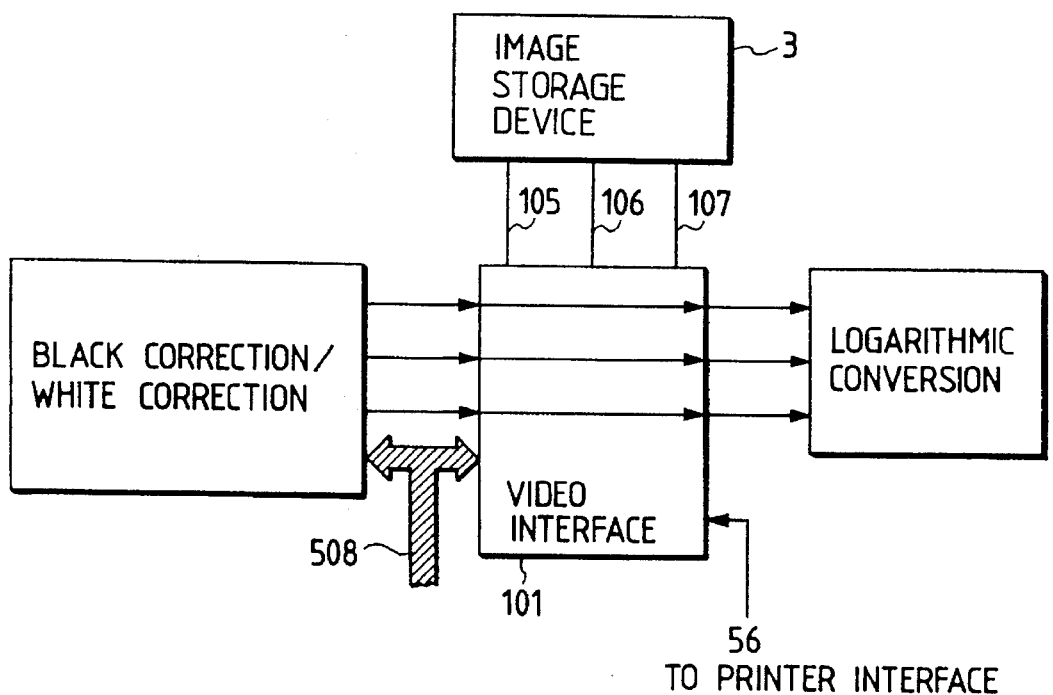

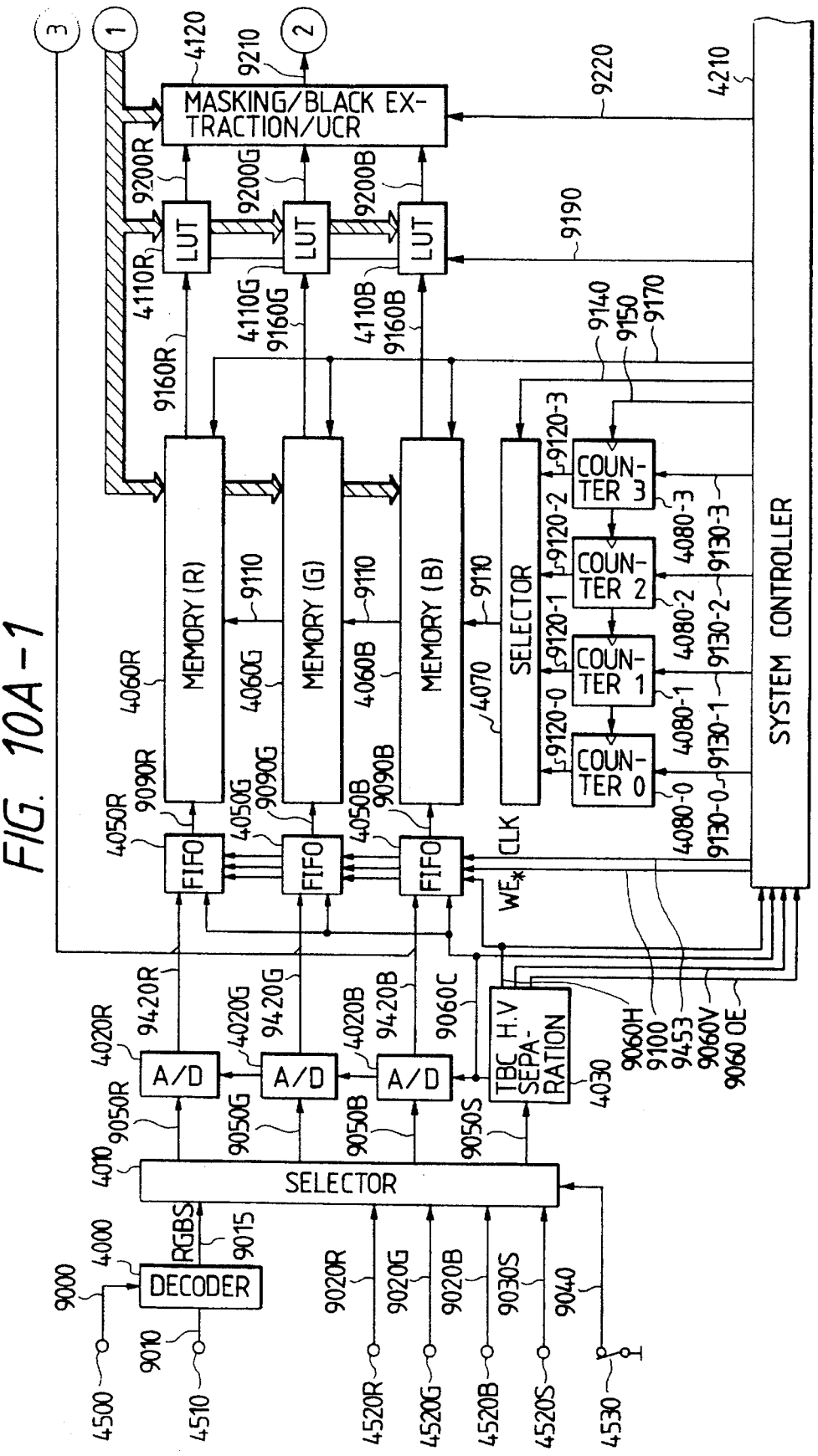

FIG. 16B-1

TRACK CONTENTS (TRACK TABLE OUT)

BIT STRUCTURE : $\underline{b_7\ b_6}\ \underline{b_5\ b_4\ b_3\ b_2\ b_1\ b_0}$
$\phantom{BIT STRUCTURE : }\ \ \ \ A\ \ \ \ \ \ \ \ \ \ \ \ \ \ \ \ B$

A SECTION

| $b_7$ | $b_6$ | CONTENT |
|---|---|---|
| 0 | 0 | VACANT TRACK |
| 0 | 1 | AUDIO TRACK |
| 1 | 0 | DIGITAL INFORMATION TRACK |
| 1 | 1 | VIDEO TRACK |

B SECTION

| $b_5$ | MALFUNCTION TRACK |
|---|---|
| $b_4$ | PRELIMINARY |
| $b_3$ | *FIELD / FRAME |
| $b_2$ | *INNER TRACK / OUTER TRACK |
| $b_1$ | AUDIO ADAPTATION |
| $b_0$ | AUDIO SEQUENCE HEAD ADAPTATION |

FIG. 16B-2

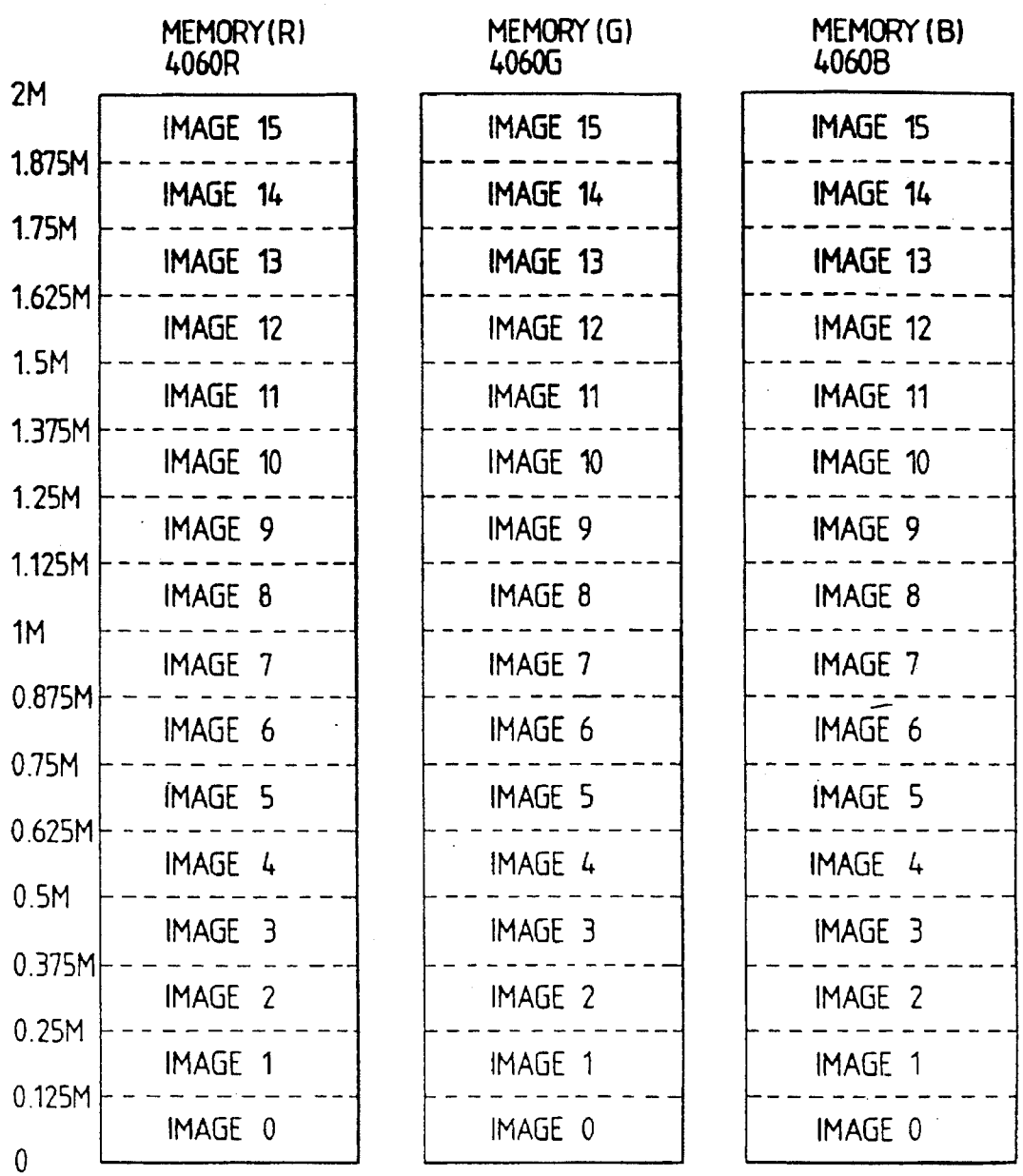

IMAGE PROCESSING SYSTEM CAPABLE OF PROCESSING DIFFERENT TYPES OF INFORMATION

This application is a continuation application Ser. No. 08/087,344, filed Jul. 1, 1993, now abandoned, which is a continuation of Ser. No. 07/946,021, filed Sep. 17, 1992, now abandoned, which is a continuation of Ser. No. 07/636,436, filed Dec. 31, 1990, all now abandoned.

BACKGROUND OF THE INVENTION

1. Field of the Invention

The present invention relates to an image processing system for forming an image from input information.

2. Related Background Art

In recent years, large-capacity storage media such as a so-called still video disk (SVD) and a so-called compact disk (CD), or an optomagnetic disk (OMD) have become very popular. Various types of information such as image information, audio information, and digital information are stored in these recording media.

Various types of information are, however, physically stored in such a recording medium. Even if various types of information are stored in the recording medium, information processed by a reproducing apparatus is of one type. When information which is not supposed not to be processed by the reproducing apparatus is included in input information, a user cannot understand the meaning when this information is reproduced, thus confusing the user. For this reason, only one type of information is usually stored in each recording medium. From this point of view, a recording medium function of recording various types of information is not sufficiently utilized.

SUMMARY OF THE INVENTION

It is an object of the present invention to provide a new image processing apparatus in consideration of the above situation.

It is another object of the present invention to provide an image processing system capable of efficiently utilizing a recording medium capable of storing various types of information.

It is still another object of the present invention to provide an image processing system capable of appropriately and visually checking attributes of pieces of information stored in a recording medium.

It is still another object of the present invention to provide an image processing system capable of easily determining a recording state of a medium in which different types of signals are recorded.

Under these objects, according to an aspect of the present invention, there is disclosed an apparatus comprising reproducing means for reading out information stored in a recording medium and an attribute of the information, information generating means for generating predetermined image information, and image forming means for forming information reproduced by the reproducing means as a visual image when the attribute of the information reproduced by the reproducing means is an attribute of image information, and for visually forming image information generated by the information generating means when the attribute of the information reproduced by the reproducing means is an attribute except for the attribute of the image information, wherein the attribute of given information is read out together with the given information stored in the recording medium, the reproduced raw information is formed as a visual image when the attribute of the given information is an attribute of image information, and otherwise, information such as a character or a picture represented by an attribute is generated as a visual image.

The above and other objects, features, and advantages of the present invention will be apparent from the detailed description of preferred embodiments in conjunction with the accompanying drawings.

BRIEF DESCRIPTION OF THE DRAWINGS

FIGS. 2A and 2B, is a block diagram showing a detailed arrangement of a color reader of the embodiment shown in FIG. 1;

FIGS. 3 to 6 are views showing switching control operations of a video interface in a color reader of the embodiment shown in FIG. 1;

FIGS. 16B-1 and 16B-2 are a view showing SV track information;

FIGS. 16C-1, 16C-2, and 16C-3 are a view showing a structure of image information in the image memory in the image recording device of this embodiment;

DETAILED DESCRIPTION OF THE PREFERRED EMBODIMENT

An embodiment according to the present invention will be described with reference to the accompanying drawings.

Figures 2, 10A:
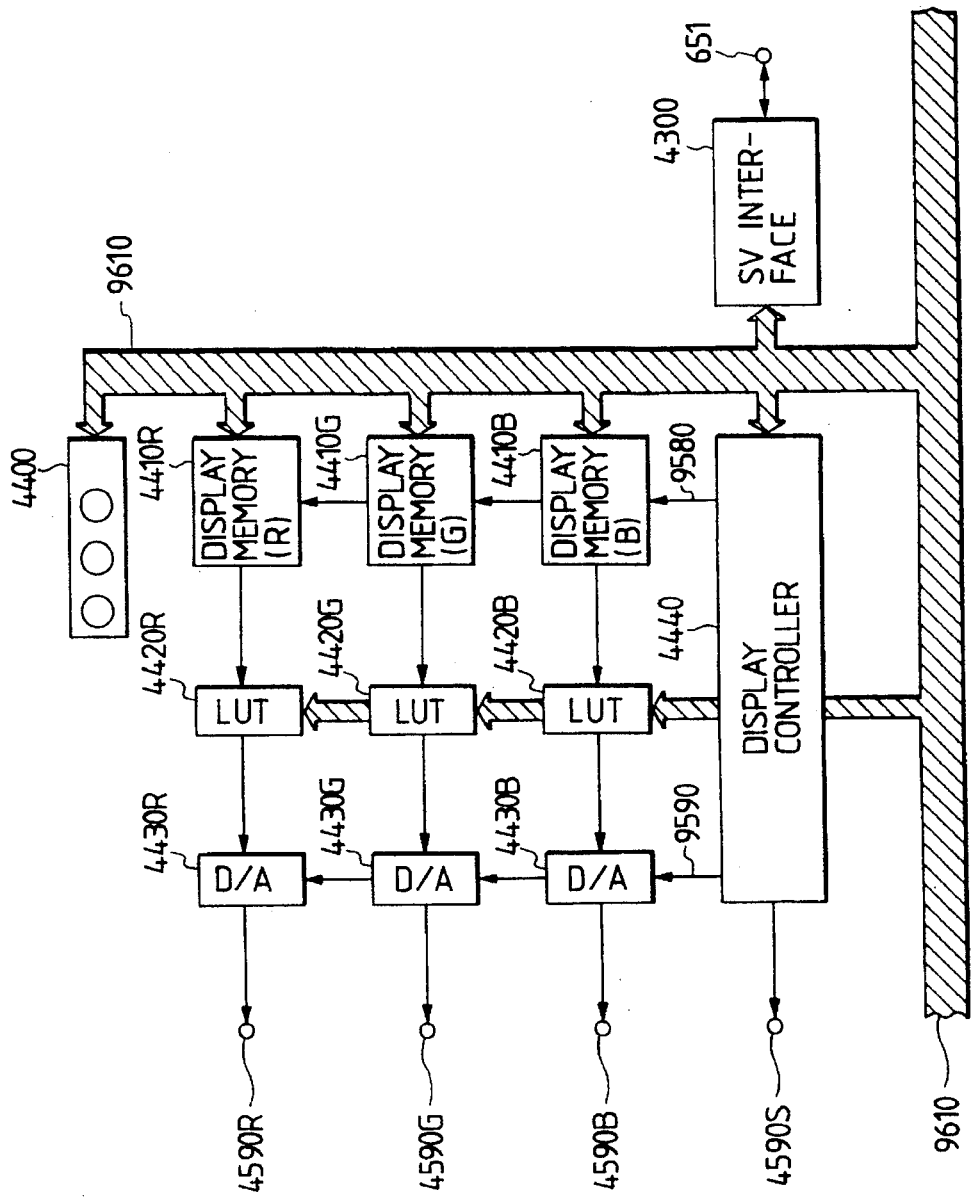
FIG. 2, comprising
FIGS. 10A (comprising FIGS. 10A-1 and 10A-2), and 10B (comprising FIGS. 10B-1 and 10B-2) are block diagrams showing a detailed arrangement of an image recording device of the embodiment shown in FIG. 1.
Figures 1, 10B:
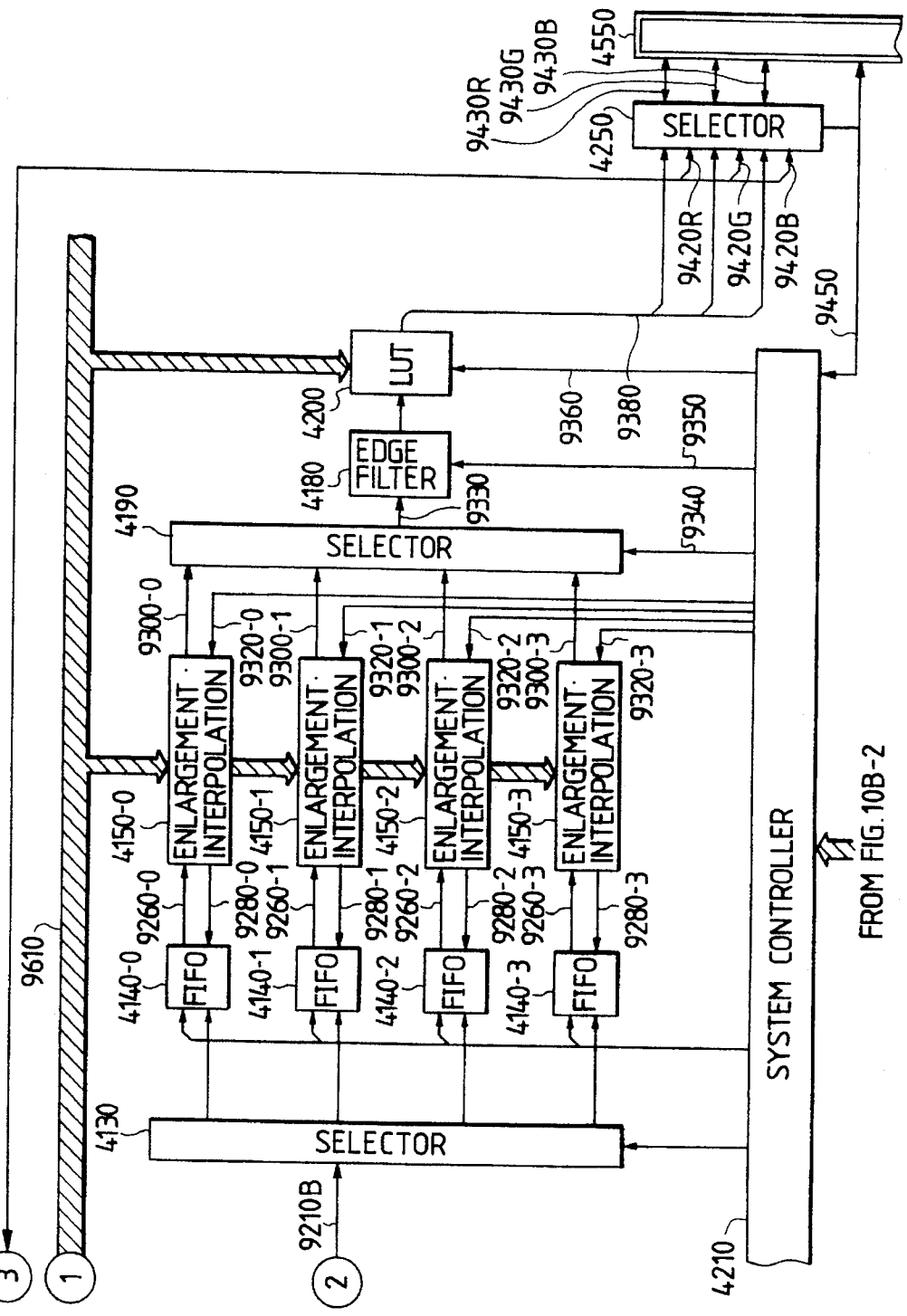
FIG. 1 is a view showing a system arrangement according to an embodiment of the present invention.
Figures 2, 10B:
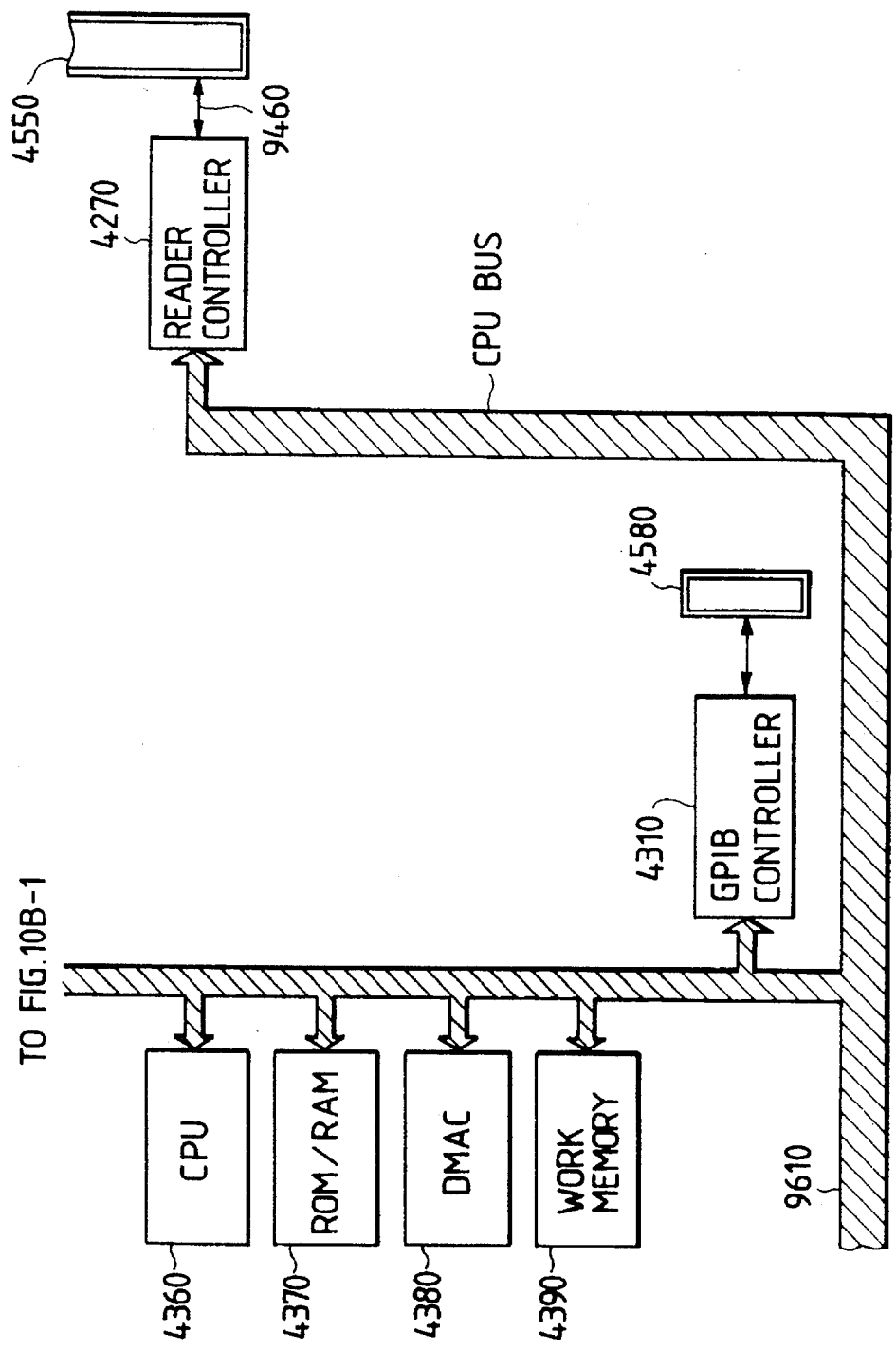

FIG. 1 is a view showing a system showing a schematic internal arrangement of a color image formation system according to an embodiment of the present invention.

The system of this embodiment comprises an image reading device (to be referred to as a color reader hereinafter) 1 for reading a digital color image, a digital color image printing device (to be referred to as a color printer hereinafter) 2 for printing and outputting a digital color image, an image recording device 3, an SV (still video) reproducing device 31, a monitor television 32, and a host computer 33.

The color reader 1 of this embodiment causes a color separating means (to be described later) and a photoelectric transducer element (comprising a CCD and the like) to read color image information of a read original in units of colors and converts the color image information into electric digital image signals.

The color printer 2 comprises an electrophotographic laser beam color printer for printing a color image according to a digital image signal in units of colors, transferring the color image to a recording sheet in the form of digital dots a plurality of times, and storing the digital dots.

The image recording device 3 comprises a device for quantizing a digital image from the color reader 1 and an analog video signal from the SV reproducing device 31, converting the input signal into a digital image, and storing the digital image.

The SV reproducing device 31 is a device for reproducing image information picked up by an SV camera and stored in a floppy disk (to be referred to as an SV floppy hereinafter) and outputting the reproduced image information as an analog video signal. The SV reproducing device 31 can receive an analog video signal and can record it in the SV floppy. In addition, the SV reproducing device 31 can also store audio information and digital information.

The monitor television 32 is a device for displaying an image stored in the image recording device 3 and contents of analog video signals output from the SV reproducing device 31.

The host computer 33 has functions of transferring image information to the image recording device 3 and receiving image information output from the SV reproducing device 31 and stored in the image recording device 3. The host computer 33 also controls the color reader 1 and the color printer.

The respective components will be described in detail below.

Description of Color Reader 1

The arrangement of the color reader 1 will be described below.

In the color reader 1 in FIG. 1, an original 999 is placed on a platen glass plate 4. A rod array lens 5 focuses light emitted from a halogen exposure lamp 10 and reflected by the original 999 and guides light as an image to an equal magnification full-color sensor 6. The rod array lens 5, the equal magnification full-color sensor 6, a sensor output signal amplifier 7, and the halogen exposure lamp 10 constitute an original scan unit 11. The original scan unit 11 scans and exposes the original 999 in a direction indicated by an arrow A1. Image information of the original 999 to be read is exposed and scanned with the original scan unit 11, so that the pieces of image information are sequentially read line by line. The read color-separated image signals are amplified to predetermined voltages by the sensor output signal amplifier 7 and are input to a video processing unit 12 through a signal line 501. The input image signals are processed by the video processing unit 12. In order to assure accurate transmission of the signals, the signal line 501 is constituted by a coaxial cable. A signal line 502 is a signal line for supplying drive pulses to the equal magnification full-color sensor 6, and all necessary drive pulses are generated by the video processing unit 12. White and black boards 8 and 9 correct white and black levels of the image signal, respectively.

A control unit 13 includes a microcomputer and controls the overall operation of the color reader 1 of this embodiment. The control unit 13 controls display operations on a scan panel 20 and key input operations through a bus 508, and controls the video processing unit 12. The control unit 13 detects a position of the original scan unit 11 through signal lines 509 and 510 in accordance with detection signals from position sensors S1 and S2.

The control unit 13 further controls the overall operations of the color reader 1 such that the control unit 13 controls a stepping motor driver 15 for driving a stepping motor 14 for driving a scan member 11 through a signal line 503, performs ON/OFF control of the halogen exposure lamp 10 by means of an exposure lamp driver 21 through a signal line 504, controls a light amount, and controls a digitizer 16, internal keys, and a display through a signal line 505.

A color image signal read by the exposure scan unit 11 during original exposure and scanning is input to the video processing unit 12 through the sensor output amplifier 7 and the signal line 501.

Figure 2B:
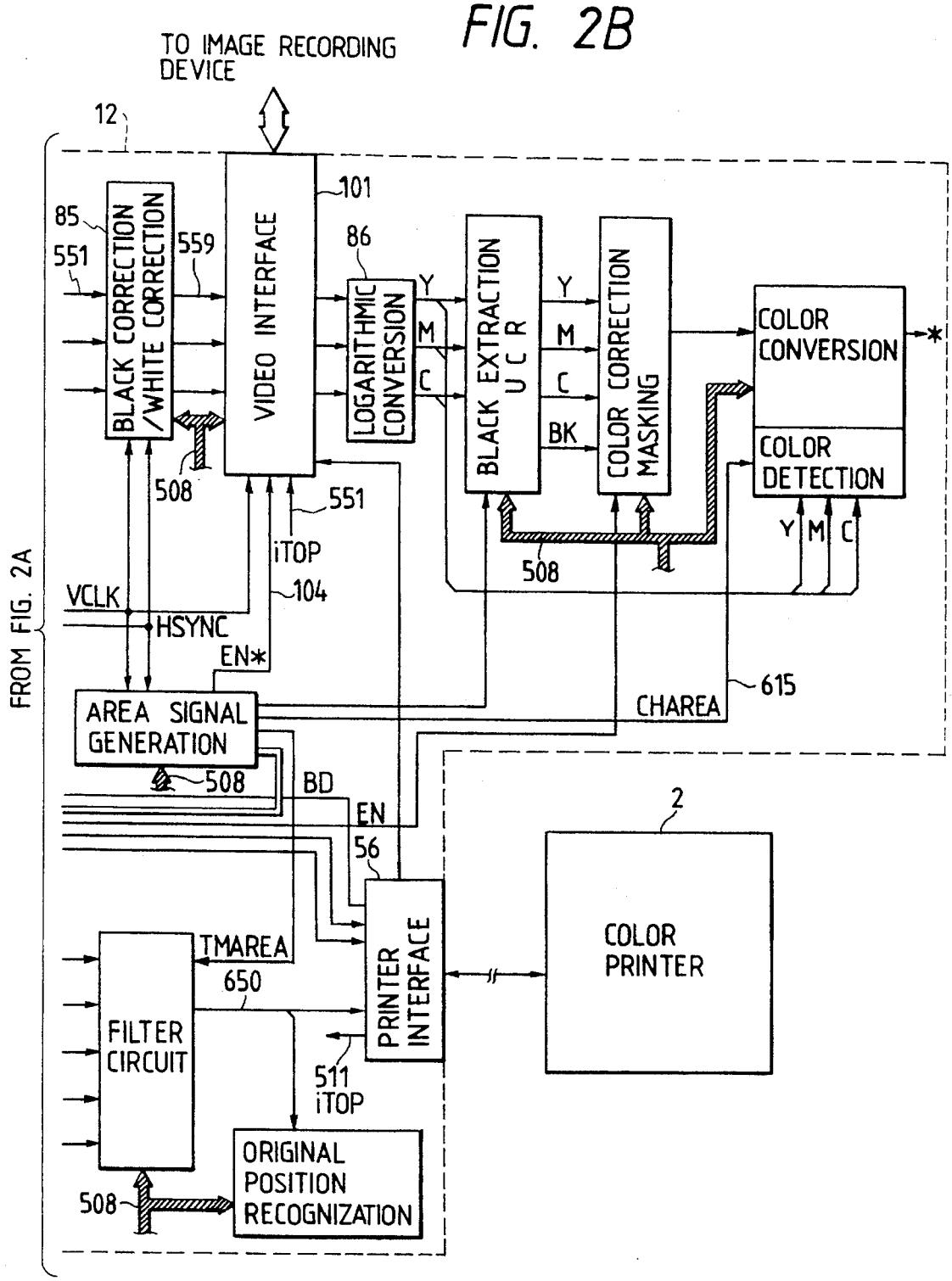

The original scan unit 11 and the video processing unit 12 will be described in detail below with reference to FIGS. 2A and 2B.

A color image signal input to the video processing unit 12 is color-separated into G (green), B (blue), and R (red) components by a sample/hold circuit S/H 43. The color-separated image signals are subjected to analog processing in an analog color signal processing circuit 44. The processed image signals are then converted into digital color image signals.

In this embodiment, the color sensor 6 in the original scan unit 11 has a staggered arrangement comprising five divided areas. By using this color sensor 6 and a FIFO memory 46, a positional error between the previously scanned second and fourth channels and the remaining first, third, and fifth channels is corrected.

A corrected signal output from the FIFO memory 46 is input to a black/white correction circuit. By utilizing signals of light reflected by the white and black boards 8 and 9, contrast variations in the color sensor 6, light amount variations in the halogen exposure lamp 10, sensitivity variations in the sensor, and the like are corrected.

Color image data proportional to an input light amount of the color sensor 6 is input to a video interface 101 and is connected to the image recording device 3.

Figure 3:
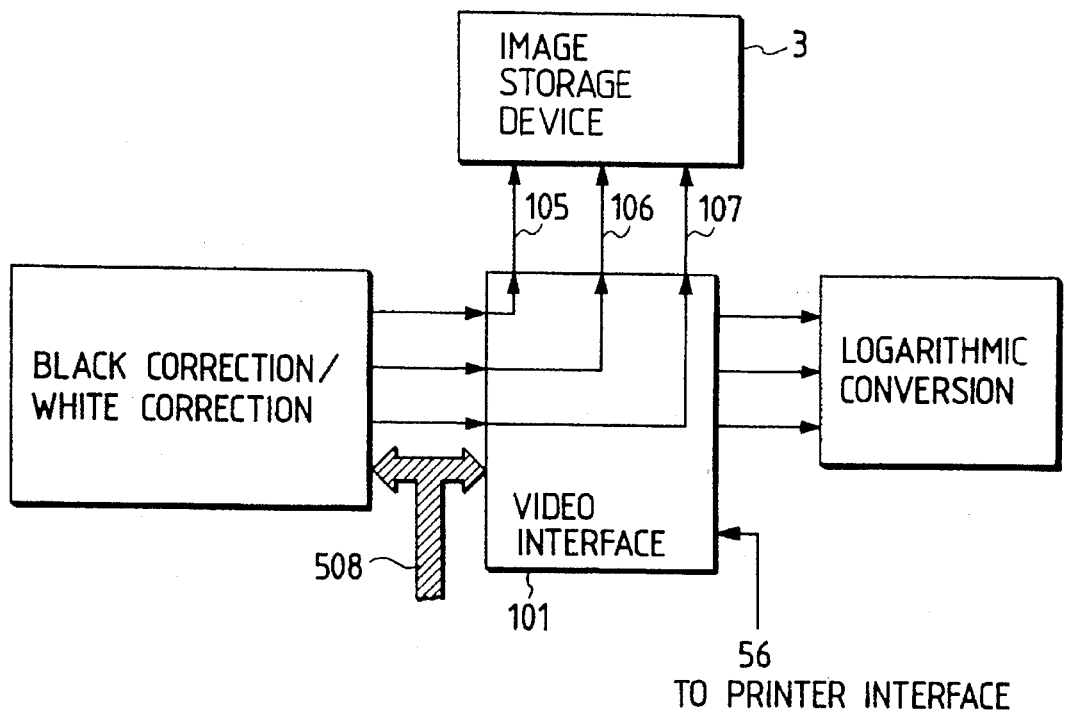
Figure 4:
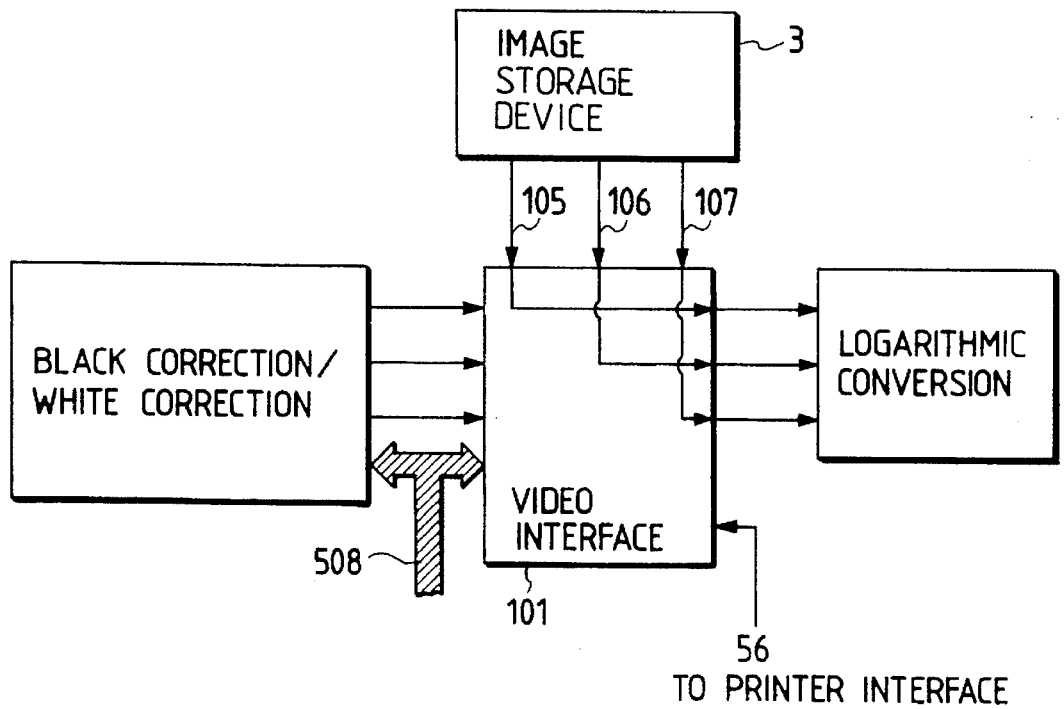

The video interface 101 has various functions shown in FIG. 3 to 6. That is, (1) a function of outputting a signal 559 from the black/white correction circuit to the image recording device 3 (FIG. 3);

(2) a function of supplying image information from the image recording device 3 to a logarithmic conversion circuit 86 (FIG. 4);

(3) a function of supplying image information from the printer interface 56 to the image recording device 3 (FIG. 5); and (4) a function of transferring the signal 559 from the black/white correction circuit to the logarithmic conversion circuit 86 (FIG. 6).

These four functions are selectively switched by a CPU control line 508, as shown in FIGS. 3 to 6.

Description of Image Recording Device 3

Read (reception) control of the color reader 1 and storage control of the read image information in the image recording device 3 according to this embodiment will be described below.

Figure 7:
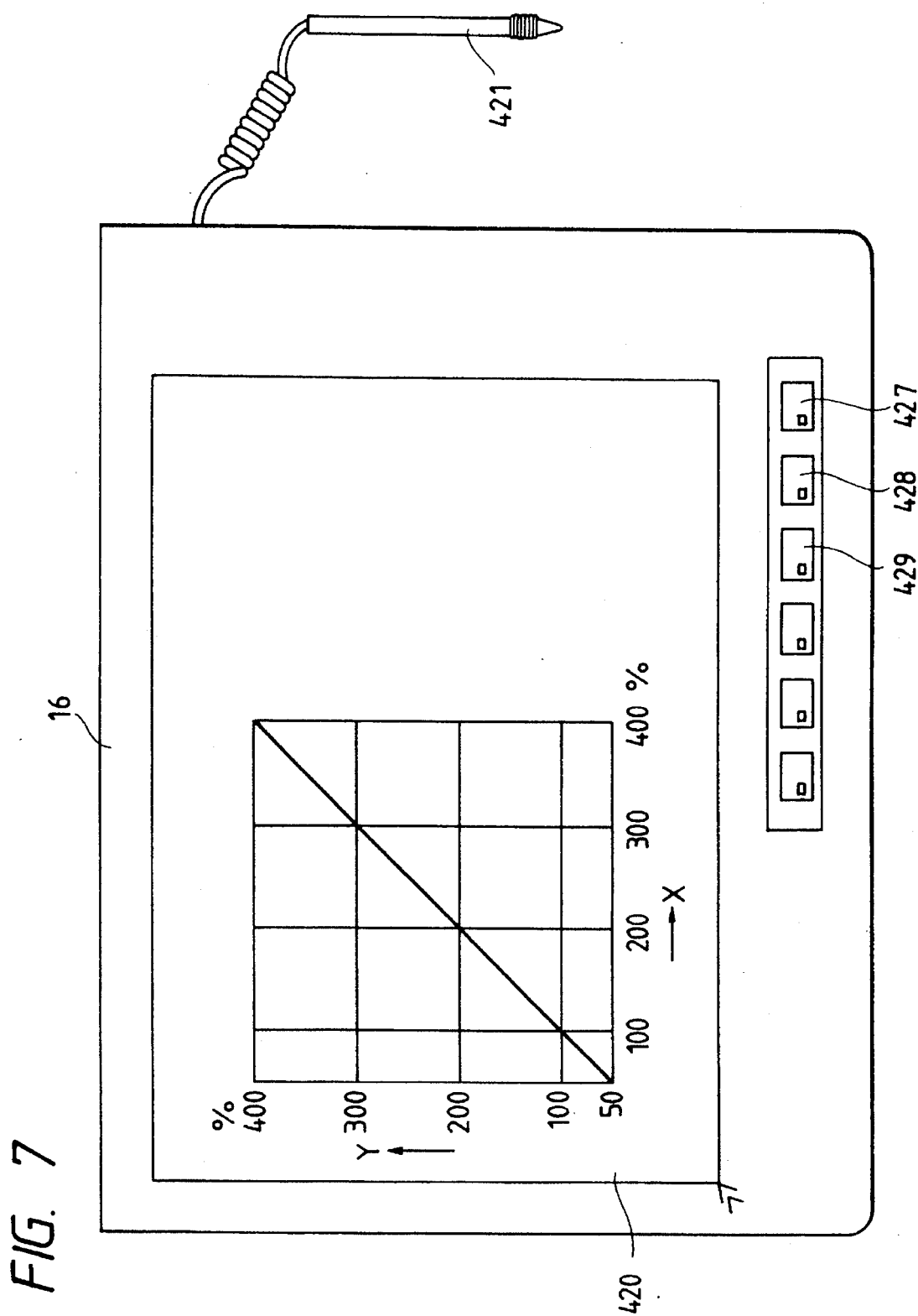
FIG. 7 is view showing a digitizer of the embodiment shown in FIG. 1.

The read setup of the color reader 1 is performed by a digitizer (to be described below). FIG. 7 is a front view showing an outer appearance of the digitizer 16.

Referring to FIG. 7, the digitizer 16 comprises an entry key 427 for transferring image data from the color reader 1 to the image recording device 3. A coordinate detection board 420 is used to designate an arbitrary area of a read original and to set a read magnification rate. A point pen 421 is used to designate coordinates of an arbitrary position.

In order to transfer image data of an arbitrary area of the original to the image recording device 3, an operator depresses the entry key 427 and designates a read position with the point pen 421.

This read area information is sent to the video processing unit 12 through a communication line 505 shown in FIG. 1. The video processing unit 12 sends this signal from the video interface 101 to the image recording device 3 through the CPU control line 508.

When a read position is not designated with the point pen 421 upon depression of the entry key 427, the color reader 1 detects a size of the original 999 by prescanning, and the detected information is sent as image read area information to the image recording device 3 through the video interface 101.

The process for sending information of the designated area of the original 999 to the image recording device 3 will be described below.

Figure 8:
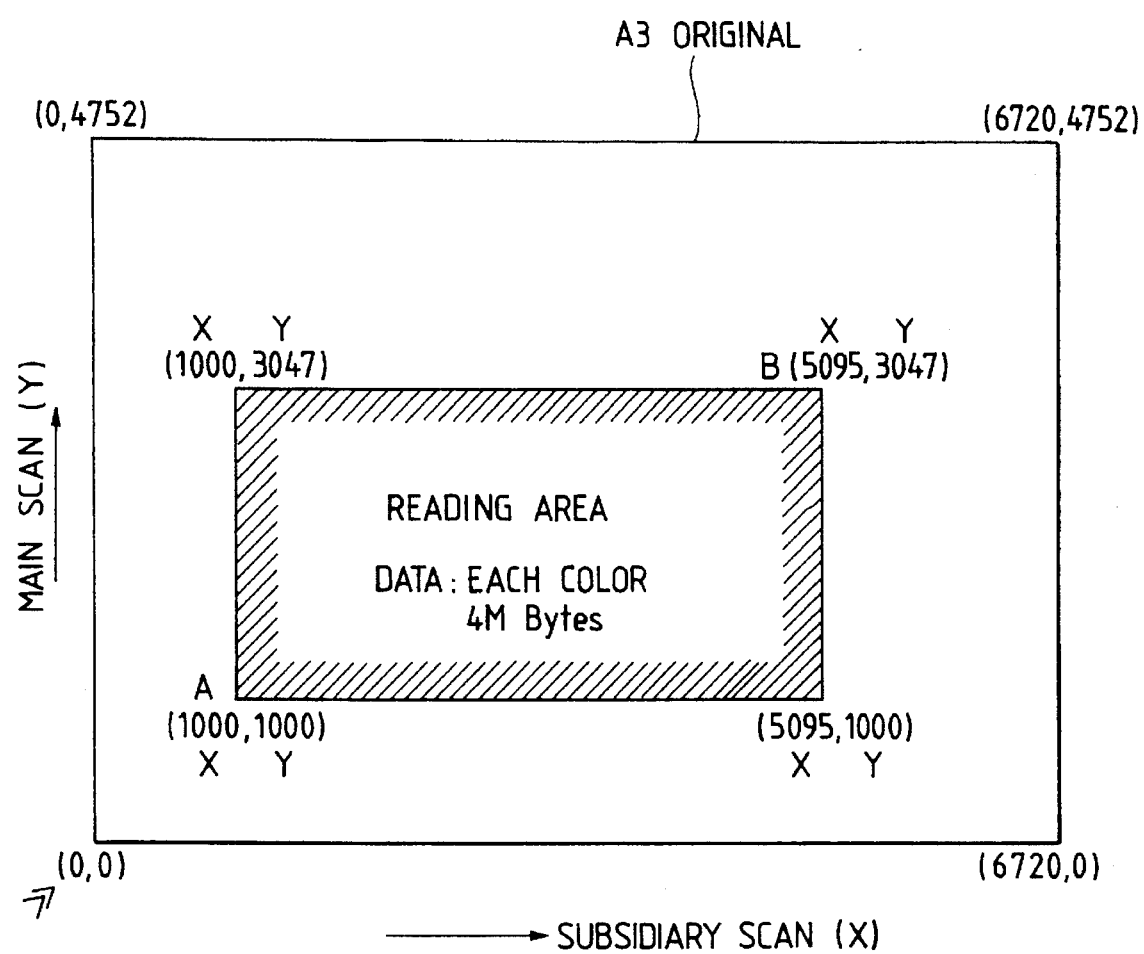
FIG. 8 is a view for explaining address information designated by the digitizer shown in FIG. 7.

FIG. 8 shows addresses of area information (A and B points) designated with the point pen 42 of the digitizer 16.

In addition to this area information, the video interface 101 also sends a VCLK signal, an ITOP 551, and an EN* (where * indicates a negative logic signal) signal 104 from an area signal generator 51 together with image data to the image recording device 3.

Figure 9:
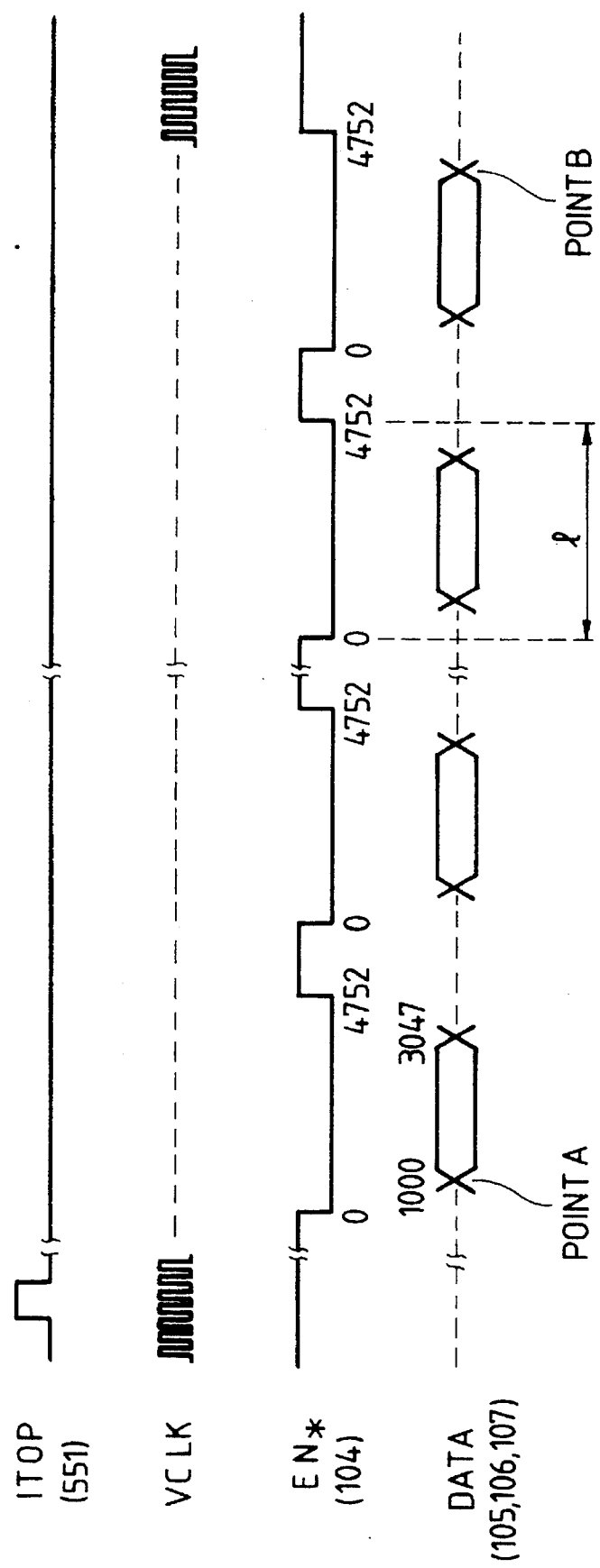
FIG. 9 is a timing chart showing timings of outputs from the interface to an image recording device of the embodiment shown in FIG. 1.

FIG. 9 is a timing chart showing these output signals.

As shown in FIG. 9, upon depression of a start button of an operation pen 120, the stepping motor 14 is driven to start scanning of the original scan unit 11. When the original scan unit 11 reaches a leading end of an original, the ITOP signal 551 is set at logic "1". When the original scan unit 11 reaches an area designated by the digitizer 16 and scans this area, the EN* signal 104 is kept at logic "1". For this reason, pieces of read color image information (DATA 105, 106, and 107) are received while the EN* signal 104 is kept at logic "1".

As shown in FIG. 9, by controlling the video interface 1001, as shown in FIG. 3, the R data 105, the G data 106, and the B data 107 are sent to the image recording device 3 in real time in synchronism with the control signals as the ITOP 551 and the EN* signal 104, and the VCLK signal.

A detailed operation for storing the image data in the image recording device in accordance with the control signals will be described with reference to FIGS. 10A and 10B.

A connector 4550 is connected to the video interface 101 of the color reader 1 through a cable. The R data 105, the G data 106, and the B data 107 are connected to a selector 4250 through signal lines 9430R, 9430G, and 9430B, respectively. The VCLK signal, the EN* signal 104, and the ITOP 551 from the video interface 101 are directly input to a system controller 4210 through a signal line 9450.

Prior to original reading, the area information designated with the digitizer 16 is input to a reader controller 4270 through a communication line 9460 and is then fetched by a CPU 4360 through a CPU bus 9610.

The R data 105, the G data 106, and the B data 107 input to the selector 4250 through the signal lines 9430R, 9430G, and 9430B are selected by the selector 4250, are output to signal lines 9420R, 9420G, and 9420B and are input to FIFO memories 4050R, 4050G, and 4050B, respectively.

Figure 11:
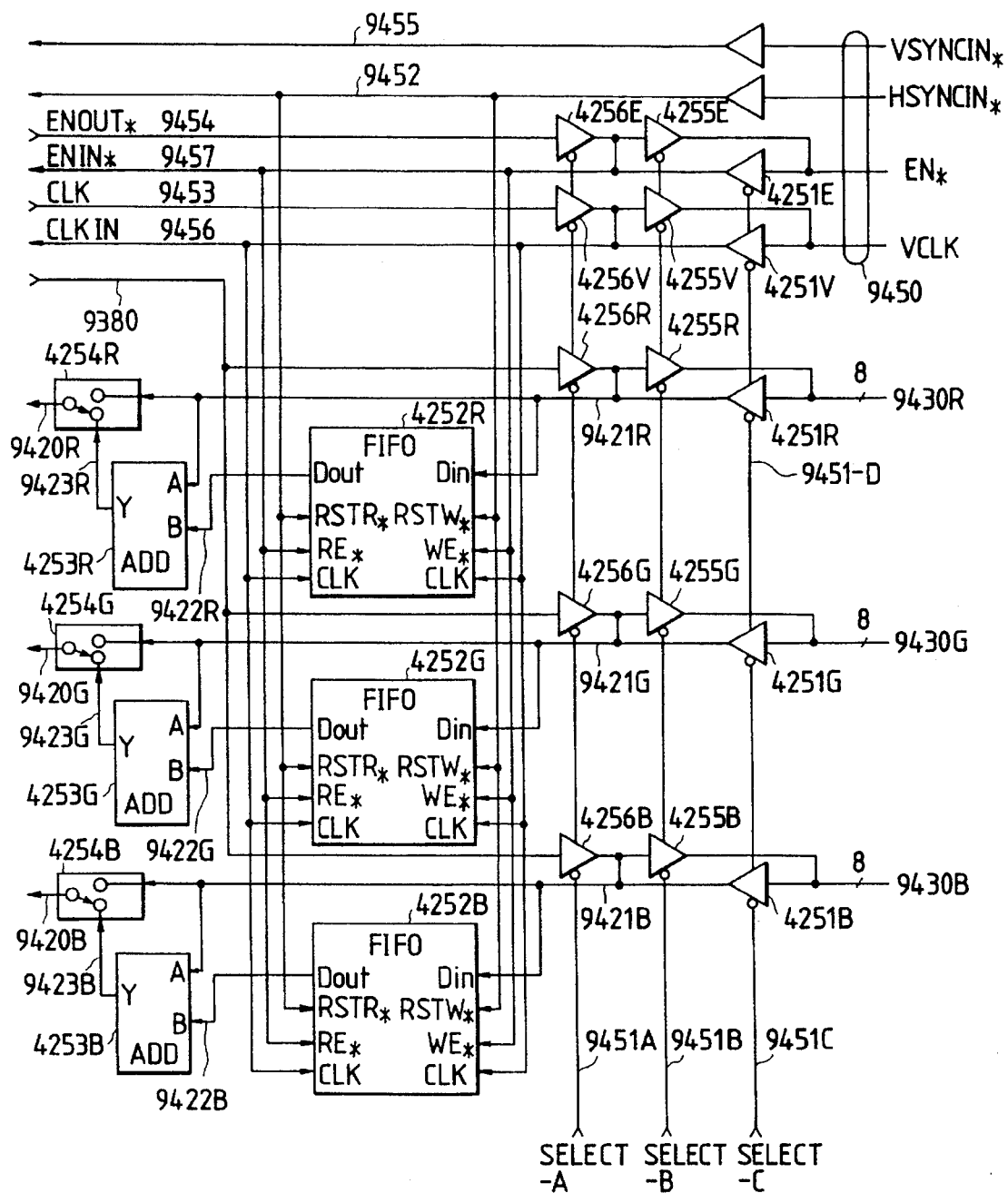
FIG. 11 is a circuit diagram showing a detailed arrangement of a selector of the image recording device of the embodiment shown in FIG. 1.

FIG. 11 is a circuit diagram showing a detailed arrangement of the selector 4250.

As shown in FIG. 11, in order to store image information from the color reader 1 to the image recording device 3, a control signal SELECT-A (9451A), a control signal SELECT-B (9451B), and a control signal SELECT-C (9451C) from the system controller 4210 are respectively set at logic "1", "1" and "0", so that tristate buffers 4251E, 4251V, 4251G, and 4251B are enabled, and other tristate buffers 4255E, 4255V, 4255R, 4255G, 4255B, and 4256E, 4256V, 4256R, 4256G, and 4256B are kept in a high-impedance state.

Similarly, of all the control signals 9450, the VCLK signal and the EN* signal are selected by the SELECT signals (9451A, 9451B, and 9451C). In order to store image information from the color reader 1 to the image recording device 3, as shown in FIG. 11, since the VCLK signal and the EN* signal are output from the color reader 1, only the tristate buffers 4251E and 4251V are enabled, and these signals are input to the system controller 4210 through CLKIN and ENIN* signal lines 9456 and 9457.

A control signal VSYNCIN* (9455) and a control signal HSYNCIN* (9452) are directly input from the connector 4550 to the system controller 4210. The selector 4250 also has a function of averaging pieces of image information from the color reader 1. The signals 9430R, 9430G, and 9430B input from the color reader 1 are input to FIFO memories 4252R, 4252G, and 4252B through signal lines 9421R, 9421G, and 9421B, respectively.

Outputs from the FIFO memories 4252R, 4252G, and 4252B are signals each delayed by one main scan period from a corresponding one of the pieces of image information 9421R, 9421G, and 9421B and are input to adders 4253R, 4253G, and 4253B through signal lines 9422R, 9422G, and 9422B, respectively. The signals 9421R, 9421G, and 9421B from the selectors 4251R, 4251G, and 4251B are input to the adders 4253R, 4253G, and 4253B, respectively. The adders 4253R, 4253G, and 4253B average two pixels in the main scan direction and two pixels in the subsidiary scan direction, i.e., average values of the four pixels, and output them to signal lines 9423R, 9423G, and 9423B, respectively.

Selectors 4254R, 4254G, and 4254B select the image signals 9421R, 9421G, and 9421B from the color reader 1 or the averaged sums 9423R, 9423G, and 9423B. The selectors 4254R, 4254G, and 4254B output signals 9420R, 9420G, and 9420B to FIFO memories 4050R, 4050G, and 4050B.

Of the image data 9420R, 9420G, and 9420B from the selectors 4254R, 4254G, and 4254B, the system controller 4210 sends only valid image area information to the FIFO memories 4050R, 4050G, and 4050B. At this time, the system controller 4210 also performs trimming processing and magnification conversion processing.

The FIFO memories 4050R, 4050G, and 4050B absorb differences between clock speeds of the color reader 1 and the image recording device 3.

These processing operations of this embodiment will be described with reference to a circuit diagram of FIG. 12 and a timing chart of FIG. 13.

Prior to data transfer from the selectors 4253R, 4253G, and 4253B to the FIFO memories 4050R, 4050G, and 4050B, the valid area of the area designated with the digitizer 16 in the main scan direction is written in comparators 4232 and 4233 through the CPU bus 9610. A start address of the area designated with the digitizer 16 in the main scan direction is set in the comparator 4232, and a stop address is set in the comparator 4233.

In the subsidiary scan direction of the area designated with the digitizer 16, a selector 4213 is controlled to select the CPU bus 9610, so that "0" information is written in the valid area of the area designated in a RAM 4212 and "1" information is written in an invalid area.

Magnification conversion processing in the main scan direction is performed by setting a magnification rate in a rate multiplier 4234 through the CPU bus 9610. Magnification conversion processing in the subsidiary scan direction is performed by information written in the RAM 4212.

Figure 13:
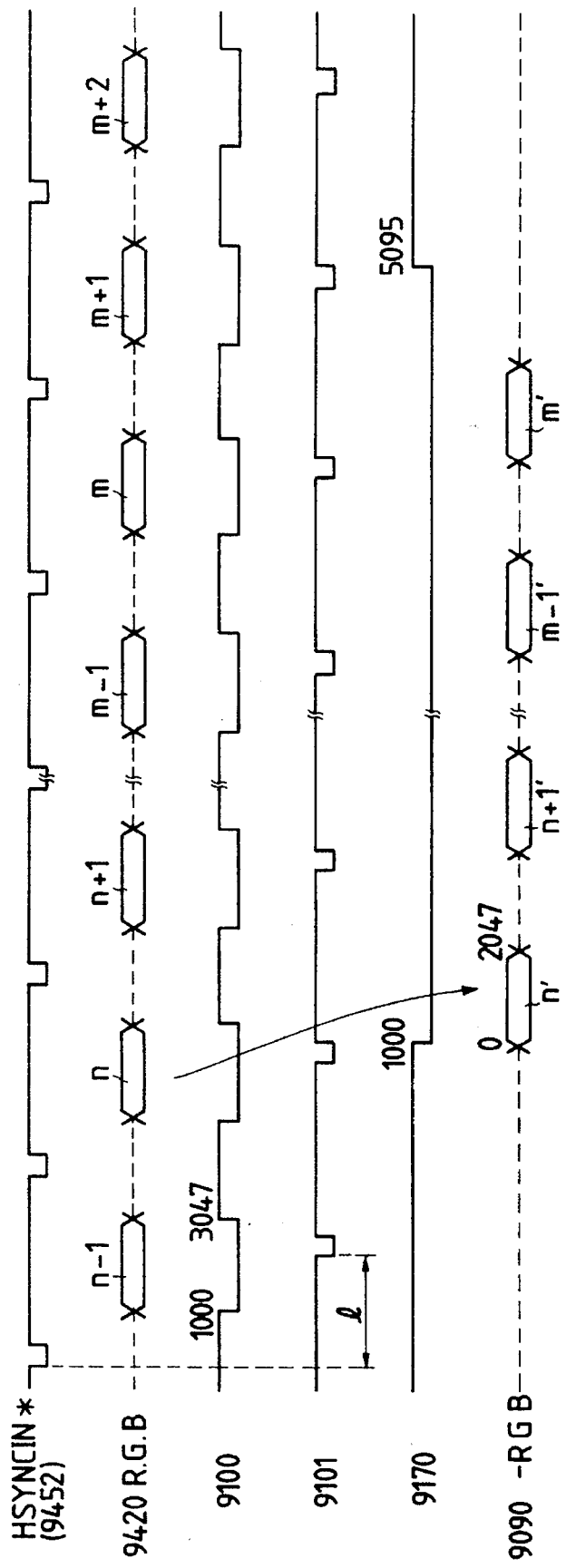
FIG. 13 is a timing chart showing an operation for storing digital information in the FIFO memories in a system controller in an equal magnification mode of this embodiment.

FIG. 13 is a timing chart of trimming processing. As described above, when only the area designated with the digitizer 16 is to be stored in a memory (trimming processing), a trimming position in the main scan direction is set in the comparators 4232 and 4233, and a trimming position in the subsidiary scan direction is set so that the selector 4213 selects the CPU bus 9610, thereby causing the CPU to write information in the RAM 4212.

A trimming operation will be explained wherein a trimming position falls within the range of 1,000 to 3,047 in the main scan direction and 1,000 to 5,095 in the subsidiary scan direction.

A trimming interval signal 9100 in the main scan direction is synchronized with the HSYNCIN* signal 9452 and the CLKIN 9456 to operate a counter 4230. When a count 9103 reaches 1,000, an output from the comparator 4232 is set at logic "1", and an output Q from a flip-flop 4235 is set at logic "1". Subsequently, when the count 9103 reaches 3,047, an output from the comparator 4233 is set at logic "1", and the output from the flip-flop 4235 goes from logic "1" to logic "0". In the timing chart of FIG. 13, since equal magnification is performed, an output from the rate multiplier 4234 is set at "1". Pieces of information corresponding to address 1,000 to address 3,047 of the color image information input to the FIFO memories 4050R, 4050G, and 4050B are written in the FIFO memories 4050R, 4050G, and 4050B in response to the trimming interval signal 9100.

A signal 9102 delayed by l pixels from a comparator 4231 is superposed on the HSYNCIN* signal 9452. In this manner, phase differences are provided between the RSTW* inputs and the RSTR* inputs of the FIFO memories 4050R, 4050G, and 4050B to absorb differences in periods between the CLKIN 9456 and the CLK 9453 input to the FIFO memories 4050R, 4050G, and 4050B.

Trimming in the subsidiary scan direction is performed as follows. An output from the counter 4214 which controls the selector 4213 is set to be valid, and an interval signal 9104 synchronized with the VSYNCIN* signal 9455 and the HSYNCIN* signal 9452 is output from the RAM 4212. The interval signal 9104 is synchronized with a signal 9102 in a flip-flop 4211, and the pieces of image information stored in the FIFO memories 4050R, 4050G, and 4050B are output during only the "0" duration of the trimming signal 9101 (n' to m').

In the above description, only trimming processing has been described. However, magnification conversion processing together with trimming can be performed. In magnification conversion in the main scan direction, a magnification rate is set in the rate multiplier 4234 through the CPU bus 9610. Magnification conversion in the subsidiary scan direction can be performed by writing data in the RAM 4212.

Figure 14:
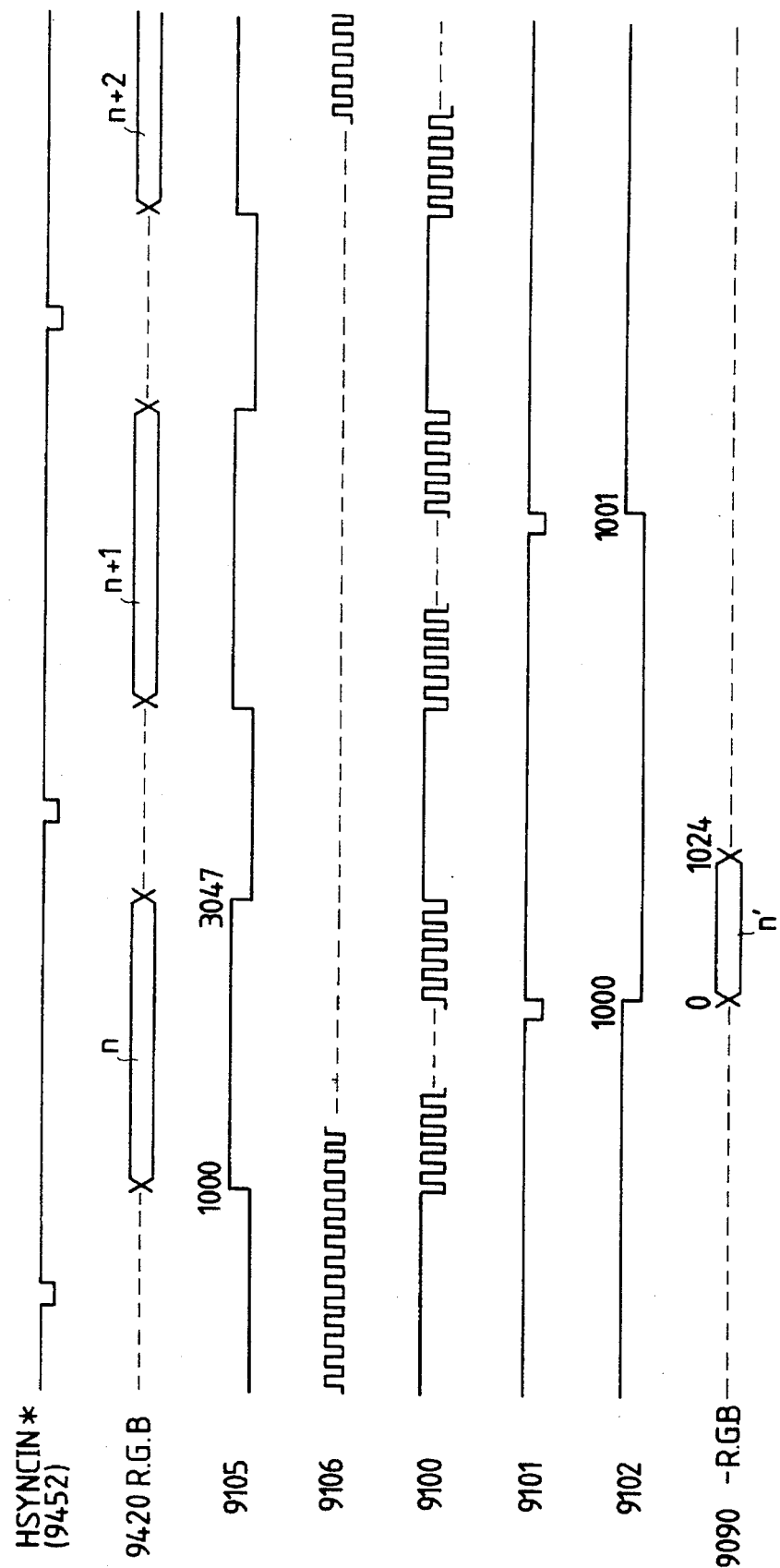
FIG. 14 is a timing chart showing an operation for storing digital information in the FIFO in the system controller in the equal magnification mode in this embodiment.

FIG. 14 is a timing chart showing an operation in which trimming processing and 50% magnification conversion are performed. FIG. 14 shows an operation in which image data from the selectors 4254R, 4254G, and 4254B are reduced into 50% image data, and the 50% image data are transferred to the FIFO memories 4050R, 4050G, and 4050B.

Figure 12:
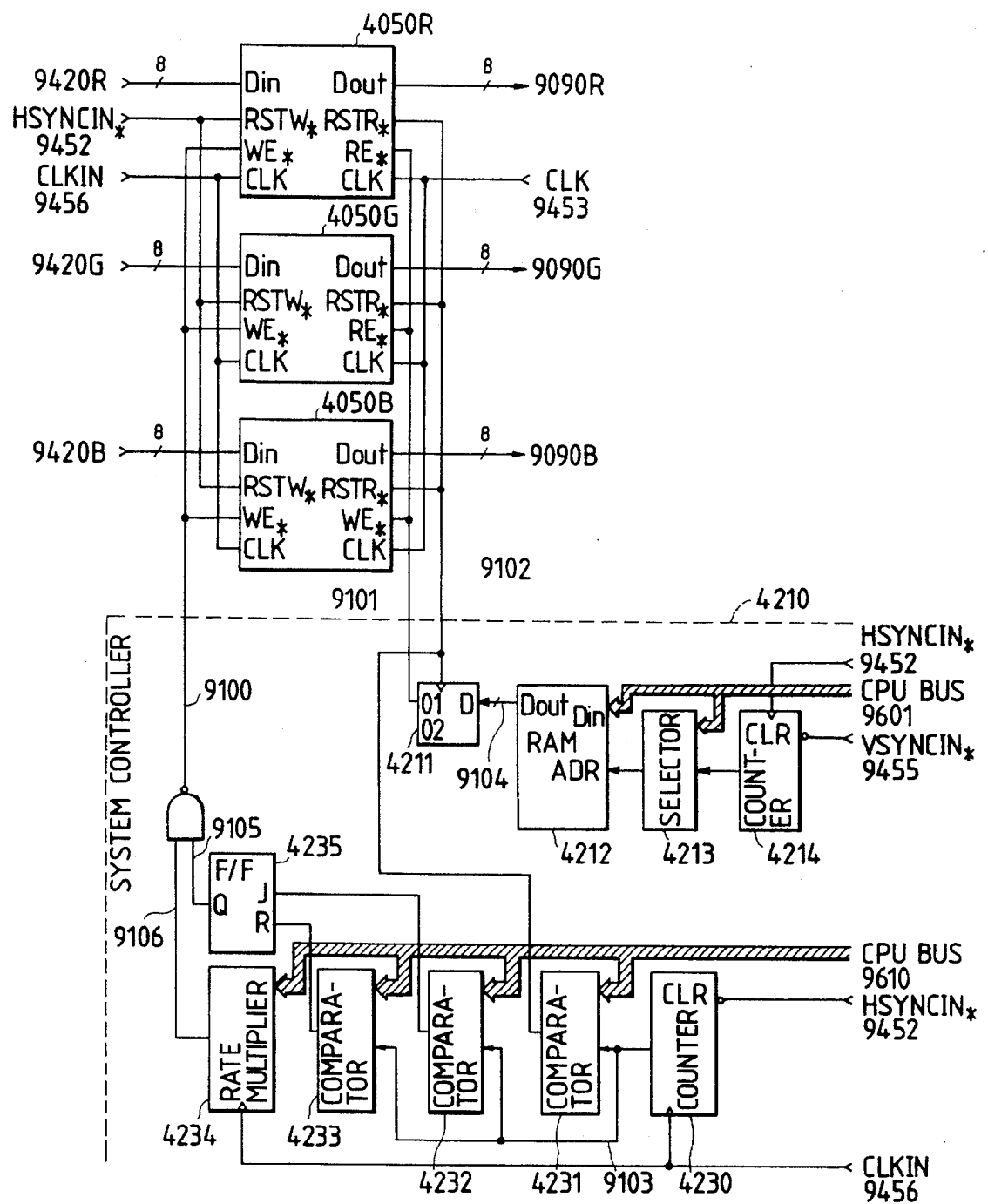
FIG. 12 is a circuit diagram showing a detailed arrangement of a system controller and FIFO memories in the image recording device of the embodiment shown in FIG. 1.

A 50% value is set in the rate multiplier 4234 of FIG. 12 through the CPU bus 9610. An output signal 9106 from the rate multiplier 4234 has a waveform in which "0"s and "1"s are repeated every pixel in the main scan direction, as shown in FIG. 14. A logical AND signal 9100 derived from the signal 9106 and the interval signal 9105 produced by the comparators 4232 and 4233 controls write enable terminals of the FIFO memories 4050R, 4050G, and 4050B, thereby reducing the image. In subsidiary scanning, as shown in FIG. 14, data (read enable signals to the FIFO memories 4050R, 4050G, and 4050B) to be written in the RAM 4212 are set to "1" within the valid image data area (i.e., read inhibit state), so that only 50% reduced image data are sent to image memories 4060R, 4060G, and 4060B. In the case of FIG. 14, the read enable signal 9101 performs 50% reduction by alternately repeating the "1" and "0" data.

In trimming and magnification conversion in the main scan direction, the write enable terminals of the FIFO memories 4050R, 4050G, and 4050B are controlled. In trimming and magnification conversion in the subsidiary scan direction, the read enable terminals of the FIFO memories 4050R, 4050G, and 4050B are controlled.

The image data are transferred from the FIFO memories 4050R, 4050G, and 4050B to the memories 4060R, 4060G, and 4060B through a counter 0 (4080-0) and the control line 9101.

A signal on the control line 9101 serves as a read enable signal for the FIFO memories 4050R, 4050G, and 4050B, an enable signal for the counter 4080-0, and a write enable signal for the memories 4060R, 4060G, and 4060B.

When the control line 9101 is set at logic "0", image data read out from the FIFO memories 4050R, 4050G, and 4050B are input to the memories 4060R, 4060G, and 4060B through tristate buffers 9090R, 9090G, and 9090B, respectively. At this time, the enable signal for the counter 4080-0 is set at logic "0". A count-up signal 9120-Q is output from the counter 4080-0 in synchronism with the CLK 9453 and is input to ADRs 9110 of the memories 4060R, 4060G, and 4060B through a selector 4070.

At this time, a write enable signal WE* for the memories 4060R, 4060G, and 4060B is set at logic "0", so that the image data 9090R, 9090G, and 9090B input to the memories 4060R, 4060G, and 4060B are stored.

A memory capacity in this embodiment is 1 Mbyte in units of colors. By reducing the size of the image data of the read area in FIG. 8, the read image data are converted into data of a maximum memory capacity of the image recording device 3 and are stored therein.

In the above embodiment, the CPU 4360 calculates a valid area from the area information of an A3 original designated with the digitizer 16 and sets corresponding information in the comparators 4231 to 4233, the rate multiplier 4234, and the RAM 4212.

Figure 15:
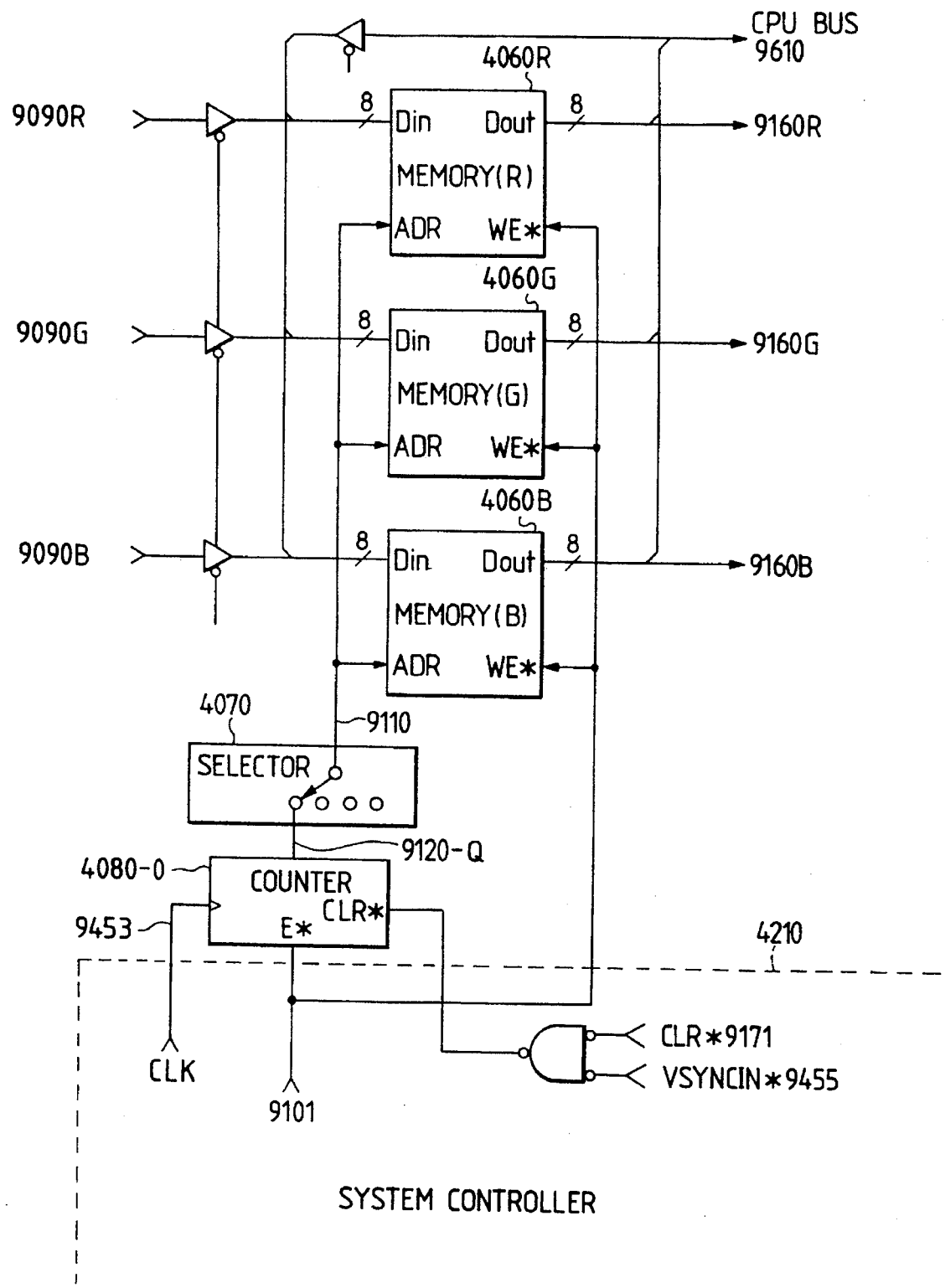
FIG. 15 is a detailed block diagram showing a relationship between the system controller and image memories in the image recording device of this embodiment.

In this embodiment, since the data volume of the read image is larger than the image memory capacity, reduction processing is performed to convert the image to data having a size equal to or smaller than the memory capacity, and the reduced image data are stored in the image memory. However, when the data volume of the read image is smaller than the image memory capacity, a CLR signal 917 in FIG. 15 is set at logic "1" to simultaneously store a plurality of images in an image memory. In this case, trimming information data is set in the comparators 4232 and 4233 for controlling the area data designated with the digitizer 16, and a magnification rate is set in the rate multiplier 4234. All "0"s are set in a valid image area of the data written in the RAM 42, and "1"s are set in other portions of the image, and the equal magnification mode is set.

In order to store a read image with an aspect ratio (i.e., a ratio of a length to a width) of the image, a valid pixel count "x" is obtained by the CPU 4360 from the area information sent from the digitizer 16, and then is obtained by a maximum capacity "y" of the image memory as follows:

$$y/x \times 100 = z$$

as a result, (1) if z=100, then 100% is set in the rate multiplier 4234, and all "0"s are set in the valid image area, and the equal magnification mode is set. In this manner, the image data are set in the RAM 4212.

(2) if z>100, then z% is set in the rate multiplier 3243 and the reduced image is stored in the 4212. While the aspect ratio is kept unchanged, the image is stored in a maximum capacity of the memory.

In this case, "1" and "0" data are appropriately written in the RAM 4212 in correspondence with the reduction rate "z".

As described above, while the aspect ratio of the input image is kept unchanged under the control of the image recording device 3, arbitrary magnification conversion processing can be easily performed, and a read image can be effectively recognized. At the same time, the memory capacity can be maximally utilized.

Description of SV Reproducing Device Interface

In the system of this embodiment, a video image from the SV reproducing device 31 can be stored in the image recording device 3, and the stored image can be output to the monitor television 32 and the color printer 2, as shown in FIG. 1. The system of this embodiment also handles an image input to the image recording device 3.

An operation for supplying a video image from the SV reproducing device 31 to the image recording device 3 will be described below.

Control of supplying the video image from the SV reproducing device 31 to the image recording device 3 will be described with reference to the block diagrams of the image recording device 3, as shown in FIGS. 10A (comprising FIGS. 10A-1 and 10A-2) and 10B (comprising FIGS. 10B-1 and 10B-2).

A video image from the SV reproducing device 31 is input in the form of an NTSC composite signal 9000 through an analog interface 4500 and is separated by a decoder 4000 into four signals 9015R, 9015G, 9015B, and 9015S, i.e., separated R, G, and B signals and a composite SYNC signal.

The decoder 4000 similarly decodes a Y(luminance)/C(chrominance) signal 9010 from the analog interface. Signals 9020R, 9020G, 9020B, and 9020S to a selector 4010 are input signals in the forms of the separated R, G, and B signals and the composite SYNC signal. A switch 4530 serves as a switch for controlling the selector 4010 to select a set of signals 9020R to 9020S or a set of signals 9015R to 9015S. When the switch 4530 is set in an open state, the signals 9020R to 9020S are selected. However, when the switch 4530 is set in a closed state, the signals 9015R to 9015S are selected.

Signals 9050R, 9050G, and 9050B serving as the separated R, G, and B signals selected by the selector 4010 are converted into digital signals by A/D converters 4020R, 4020G, and 4020B, respectively.

The selected composite SYNC signal 9050S is input to a TBC/HV separation circuit 4030, so that chrominance signals 9060C, a horizontal sync signal 9060H, and a vertical sync signal 9060V are generated from the composite SYNC signal 9050. These sync signals are supplied to the system controller 4210.

A TVCLK 9060C output from the TBC/HV separation circuit 4030 is a 12.25-MHz clock signal, the TVHSYNC* 9060H signal is a 63.5-µs signal, and the TVVSYNC* 9060V signal is a 16.7-ms signal.

The FIFO memories 4050R, 4050G, and 4050B are reset in response to the TVHSYNC* 9060 signal and, caused to write the information 9420R, 9420G, and 9420B from address "0" in synchronism with the TVCLK 9060C signal. Write access of the FIFO memories 4050R, 4050G, and 4050B is performed during the ON state of the WE* signal 9100 output from the system controller 4210.

Write control of the FIFO memories 4050R, 4050G, and 4050B in accordance with the WE* signal will be described in detail below.

The SV reproducing device 31 of this embodiment complies with NTSC standards. For this reason, when a video image from the SV reproducing device 31 is converted into a digital signal, a frame capacity is given as 640 pixels (H)×480 pixels (V). The CPU 4360 writes a preset value as 640 pixels of the main scan direction in the comparators 4232 and 4233. The input to the selector 4213 is set on the CPU bus 9610 side, and "0"s corresponding to 480 pixels in the subsidiary scan direction are written in the RAM 4212. Data "100%" is set in the rate multiplier 4234 for setting a magnification rate in the main scan direction.

When pieces of image information from the SV reproducing device 31 are to be stored in the memories 4060R,

4060G, and 4060B, the TVVSYNC* 9060V, TVHSYNC* 9060H, and TVCLK 9060 signals output from the TBC/HV separation circuit 4030 are connected to the VSYNCIN* 9455, HSYNCIN* 9452, and CLKZN 9456 signals shown in FIG. 12.

As described above, when the image control signal is set on the SV reproducing device interface, video images 9420R, 9420G, and 9420B of one scanning line from the A/D converters 4020R, 4020G, and 4020B are stored in the FIFO memories 4050R, 4050G, and 4050B in an equal magnification mode.

On the other hand, when the input SV video image is reduced and is to be stored in the FIFO memories 4050R, 4050G, and 4050B, a reduction rate is set in the rate multiplier 3234, and "1"s are set for the valid image area data in the RAM 3212 in correspondence with the reduction rate, thereby performing image reduction.

Data transfer from the FIFO memories 4050R, 4050G, and 4050B to the memories 4060R, 4060G, and 40560B is the same as write control of data from the color reader 1 to the memories 4060R, 4060G, and 4060B.

In this embodiment, the CPU 4360 in the image recording device 3 can detect types of information on the tracks of the SV floppy loaded in the SV reproducing device 31 through a signal line 651 and an SV interface 4300.

The CPU 4360 sends a command to the SV reproducing device 31 through the SV interface 4300 to output the contents of the tracks. Since the SV reproducing device of this embodiment sends back a status signal corresponding to 10 tracks in response to the command. In image registration of 16 frames, the command is set twice, and 20-track information can be obtained.

Figure 16A:
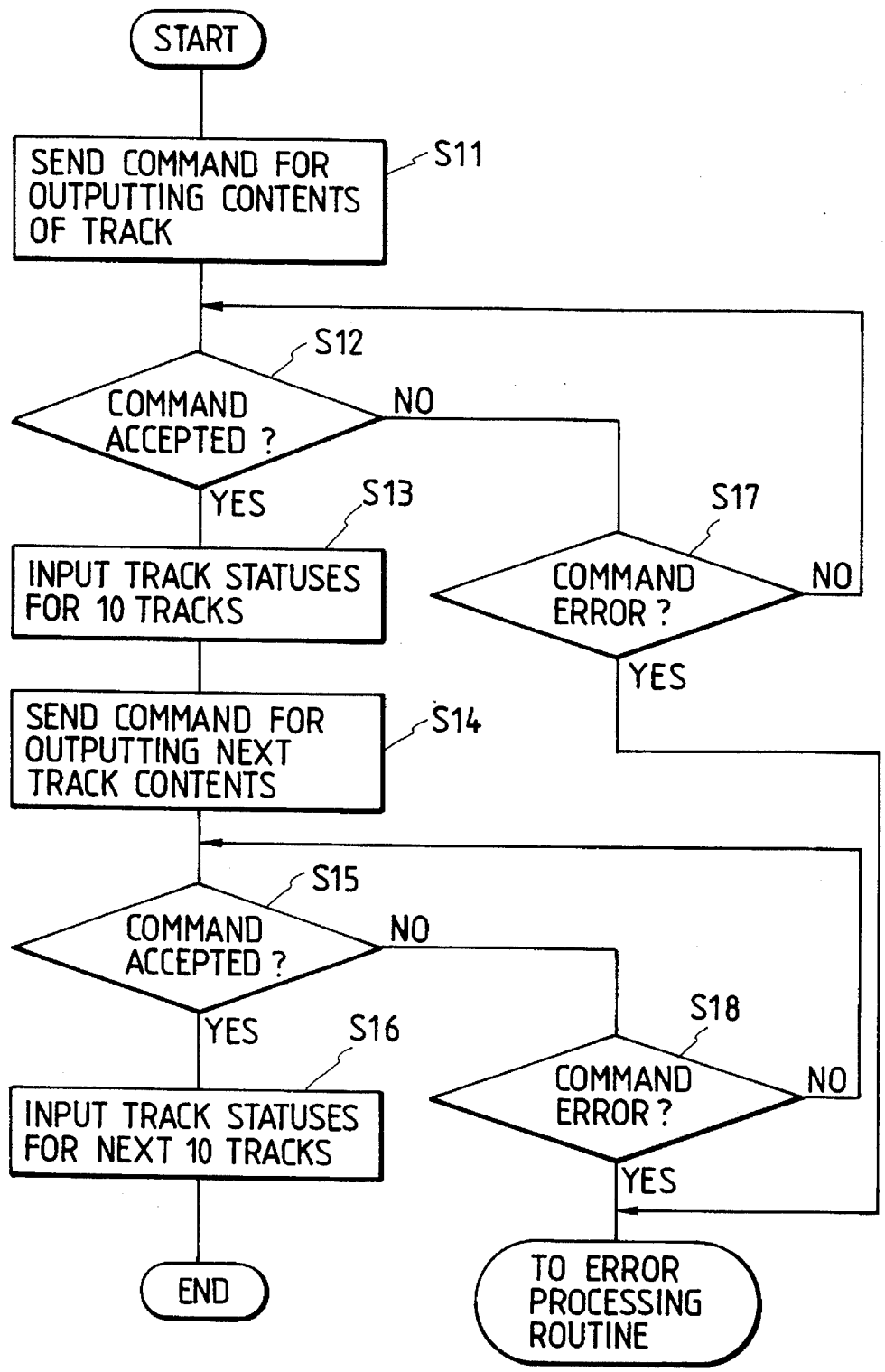
FIG. 16A is a flow chart showing SV (still video) track information exchange in communication between the image recording device and an SV reproducing device.

FIG. 16A is a flow chart showing the above operation.

The CPU 4360 sends a command to the SV reproducing device 31 to output contents of tracks (S11). If the command is appropriately accepted (S12), the statuses for 10 tracks are sent back and are received by the CPU 4360 (S13). The CPU 4360 outputs a command for outputting contents of the next tracks to the SV reproducing device 31 (S14). When this command is appropriately received (S15), the statuses of the next 10 tracks are sent back and are received by the CPU 4360 (S16). When the commands are not appropriately accepted in steps S12 and S15 and command errors occur (S17 and S18), the flow transits to an error processing routine.

FIG. 16B is a view for explaining status information of tracks.

The CPU 4360 can detect information types of desired tracks from bits $b_7$ and $b_6$ in FIG. 16B.

Assume that information of each track of the SV floppy is reproduced by the SV reproducing device and the reproduced information are stored in the memories 4060R, 4060G, and 4060B. When an output from the SV reproducing device 31 is image information, the image recording device 3 quantizes the raw information and stores them in the memories 4060R, 4060G, and 4060B. However, when an output from the SV reproducing device 31 is audio information or digital information except for image information, the CPU 4360 writes information representing the audio and/or digital information in the memories 4060R, 4060G, and 4060B through the CPU bus 9610 and does not write the raw information from the SV reproducing device 31 to the memories 4060R, 4060G, and 4060B.

FIG. 16(C) is a view showing a storage state of image data from the SV reproducing device 31 and data generated by the CPU 4360.

The SV reproducing device 31 complies with the NTSC standards, and an aspect ratio of a digital image in the main scan direction to that in the subsidiary scan direction is 4:3. However, the present invention is also applicable to future television standards such as HDTV standards having an aspect ratio of 16:9 by updating the contents of the comparators 4232 and 4233 and the RAM 4212 in FIG. 12.

The frame capacity of the NTSC standards is about 0.3 Mbyte with respect to the memory capacity of 2 Mbytes of this embodiment, so that six frames can be stored in the memory. These six frames can be stored by setting the CLR* 9171 to "1" shown in FIG. 15.

In the case of 1,840 pixels (main scan direction) ×1,035 (subsidiary scan direction) in the HDTV standards, the CLR* 9171 is set to "0", so that one frame can be stored in a 2-Mbyte memory.

In addition, the present invention can be arranged to cope with a high-band scheme of video equipment. That is, the frequency of the TVLK output from the TBC/HV separation circuit 4030 is increased to increase the number of pixels read in the main scan direction.

Read Processing of Image Recording Device 3

Image data read processing of the memories 4060R, 4060G, and 4060B in the image recording device 3 described above will be described below.

Designation for forming an image on the color printer in accordance with an image output from these memories is mainly performed by the digitizer 16 shown in FIG. 7.

Referring to FIG. 7, a key 428 is an entry key for causing the color printer 2 to perform image recording of image data from the memories 4060R, 4060G, and 4060B in accordance with a size of a recording sheet. A key 429 is an entry key for forming an image at a position designated with the coordinate detection board 420 and the point pen 421 in the digitizer 16.

Image formation performed in accordance with a size of a recording sheet, and then formation of an image in an area designated with the digitizer will be described below.

Image Forming Process Corresponding to Size of Recording Sheet

In this embodiment, the color printer 2 has two cassette trays 735 and 736 so that recording sheets 791 having two different sizes are respectively stored in these cassette trays. In this case, the sheets having two different sizes are A4 size sheets stored in the upper tray and A3 size sheets stored in the lower tray. These sheets having different sizes are selected at a liquid crystal touch panel in the operation panel 20. In the following description, formation of a plurality of images on the A4 size sheet will be explained.

Prior to image formation, by inputting image data from the SV recording device 31 to the image recording device 3, a total of 16 image data, i.e., "image 0" to "image 15" are stored from the color reader 1 to the image memories 4060R, 4060G, and 4060B, as shown in FIG. 16C.

The operator depresses the entry key 428 of the digitizer 16. A CPU (not shown) detects the key input and automatically sets the image recording device 3 to perform image formation on the A4 size sheet.

Figure 17:
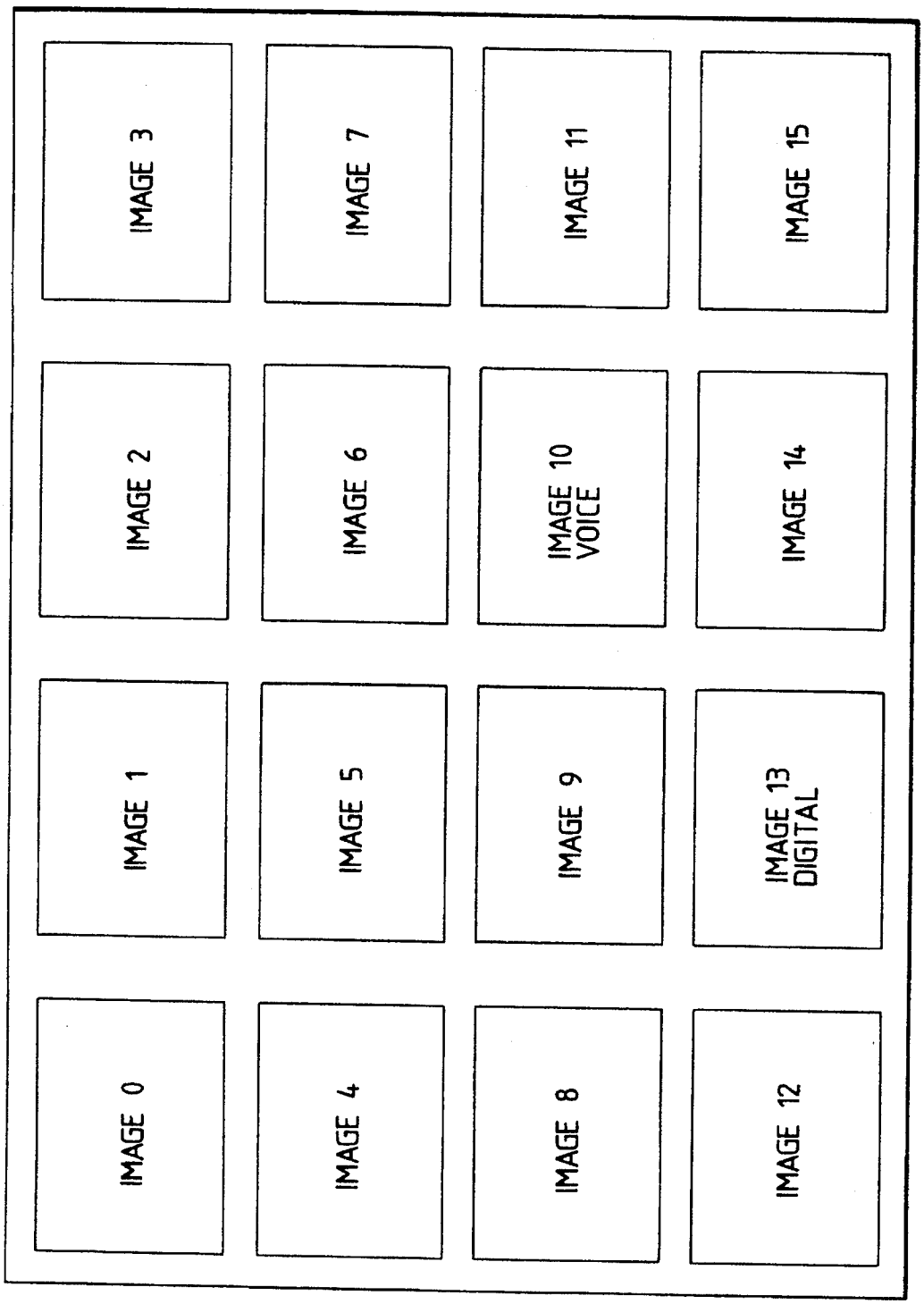
FIG. 17 is a view showing the layout of image formation of this embodiment.

In order to form the 16 images shown in FIG. 16C, the image recording device is set, as shown in FIG. 17.

Figure 18:
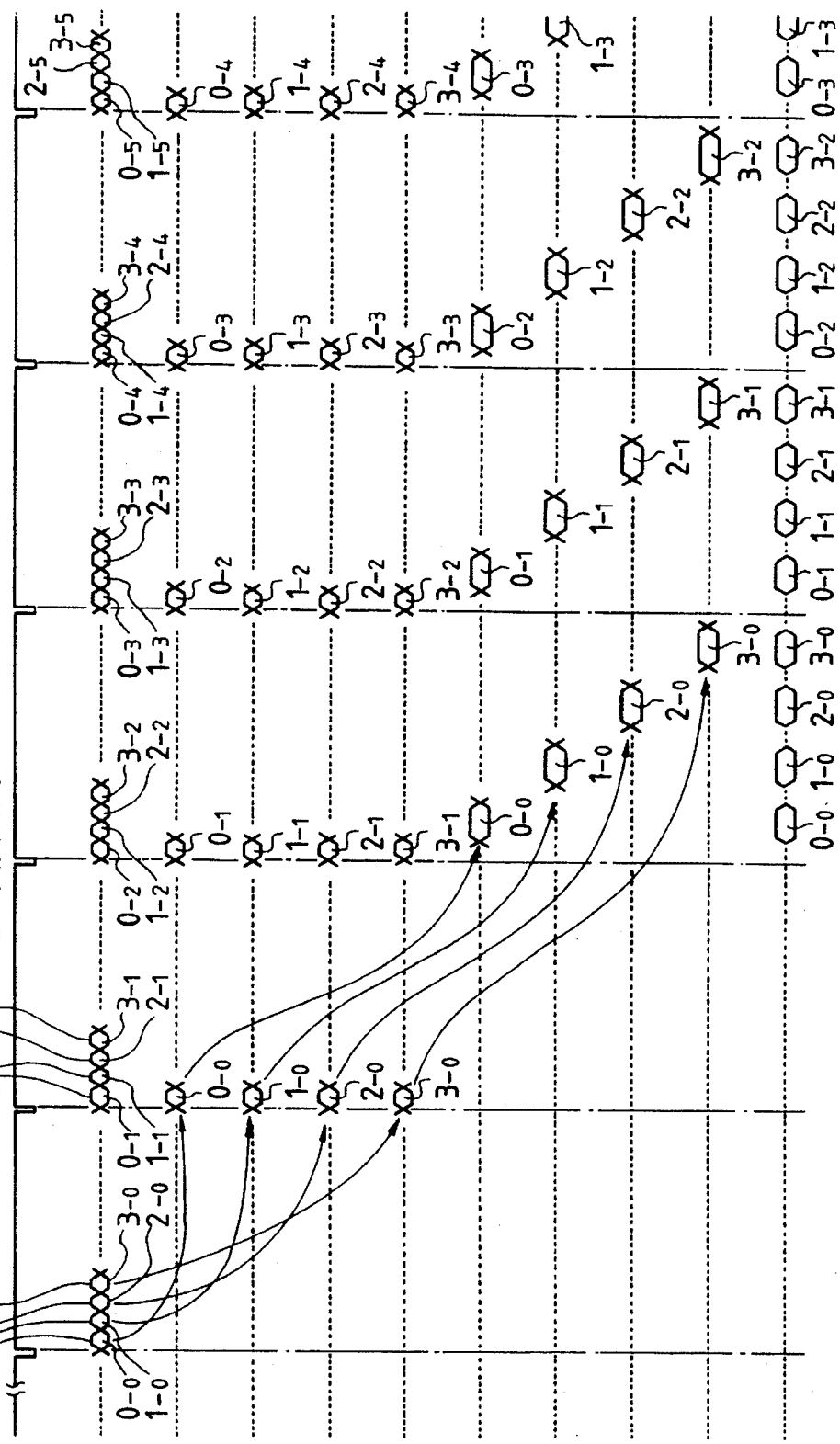
FIG. 18 is a timing chart showing an operation of image recording processing in accordance with an image formation layout shown in FIG. 17.

Details of an image forming process of this embodiment will be described with reference to the block diagrams of FIGS. 10A and 10B and a timing chart of FIG. 18.

The ITOP signal 551 sent from the color printer 2 shown in FIG. 2 to the color reader 1 through the printer interface 56 is input to the video interface 101 in the video processing unit 12 and is sent to the image recording device 3. In the image recording device 3, the image forming process is started in response to the ITOP signal 551. Each image sent to the image recording device 3 is formed under the control of the system controller 4210 (FIGS. 10A and 10B) in the image recording device 3.

Referring to FIGS. 10A and 10B, an output from the counter 0 (4080-0) is selected by the selector 4070, and the memories 4060R, 4060G, and 4060B are accessed through a memory address line 9110. By this access, image data are read out from the memories 4060R, 4060G, and 4060B, and readout image signals 9160R, 9160G, and 9160B from the respective memories are sent to look-up tables (LUTs) 4110R, 4110G, and 4110B, thereby performing logarithmic conversion so as to match a display sensitivity with a visual sensitivity of an observer. Converted data 9200R, 9200G, and 9200B from these LUTs are input to a masking/black extraction/UCR circuit 4120. The masking/black extraction/UCR circuit 4120 performs color correction of the color image signal from the image recording device 3. A UCR/black extraction operation is performed during recording in black.

A serial image signal 9210 from the masking/black extraction/UCR circuit 4120 is separated into components in units of images, and these components are input to FIFO memories 4140-0 to 4140-3. The sequentially arranged images are rearranged into parallel images by the FIFO memories 4140-0 to 4140-3.

The image signals 9160R, 9160G, and 9160B from the memories and pieces of parallel output image information 9260-0 to 9260-3 can be processed in parallel.

The parallel image signals 9260-0 to 9260-3 are input to expansion.interpolation circuits 4150-0 to 4150-3. The expansion.interpolation circuits 4150-0 to 4150-3 are controlled to produce an image layout shown in FIG. 17 by the system controller 4210. The images are expanded and interpolated, as indicated by signals 9310-0 to 9310-3 shown in FIG. 18. In this embodiment, a linear interpolation method is employed.

These interpolated signals 9300-0 to 9300-3 are input to a selector 4190 to convert the parallel image data to serial image data signals. An image signal 9330 converted into serial image data by the selector 4190 is subjected to edge emphasis and smoothing by an edge filter 4180. The processed signals are input to the selector 4250 through a signal line 9380.

The signals input to the selector 4250 pass through the tristate gates 4256R, 4256G, 4256B, 4255R, 4255G, and 4255B and are output to the connector 4550 through signal lines 9430R, 9430G, and 9430B.

Similarly, signals ENOUT* 9454 and CLK 9453 output from the system controller 4210 pass through the tristate gates 4256E, 4256V, 4255E, and 4255V and are output to the connector 4550 through the signal line 9450.

In this case, the control lines SELECT-A (9451A), SELECT-B (9451B), and SELECT-C (9451C) for controlling the tristate gates shown in FIG. 11 are respectively set at logic "0", "0" and "1".

Formation of all image data of "image 0" to "image 3" is completed, formation of "image 4" to "image 7", "image 8" to "image 11", and "image 12" to "image 15" is sequentially performed. The sixteen images, i.e., "image 0" to "image 15" shown in FIG. 17, are formed.

Image Formation by Arbitrary Position Layout

The above description has been made to automatically develop images to be formed as shown in FIG. 17 and to control image formation. However, this embodiment is not limited to this image forming process. Arbitrary images can be developed at arbitrary positions and can be formed.

Figure 20:
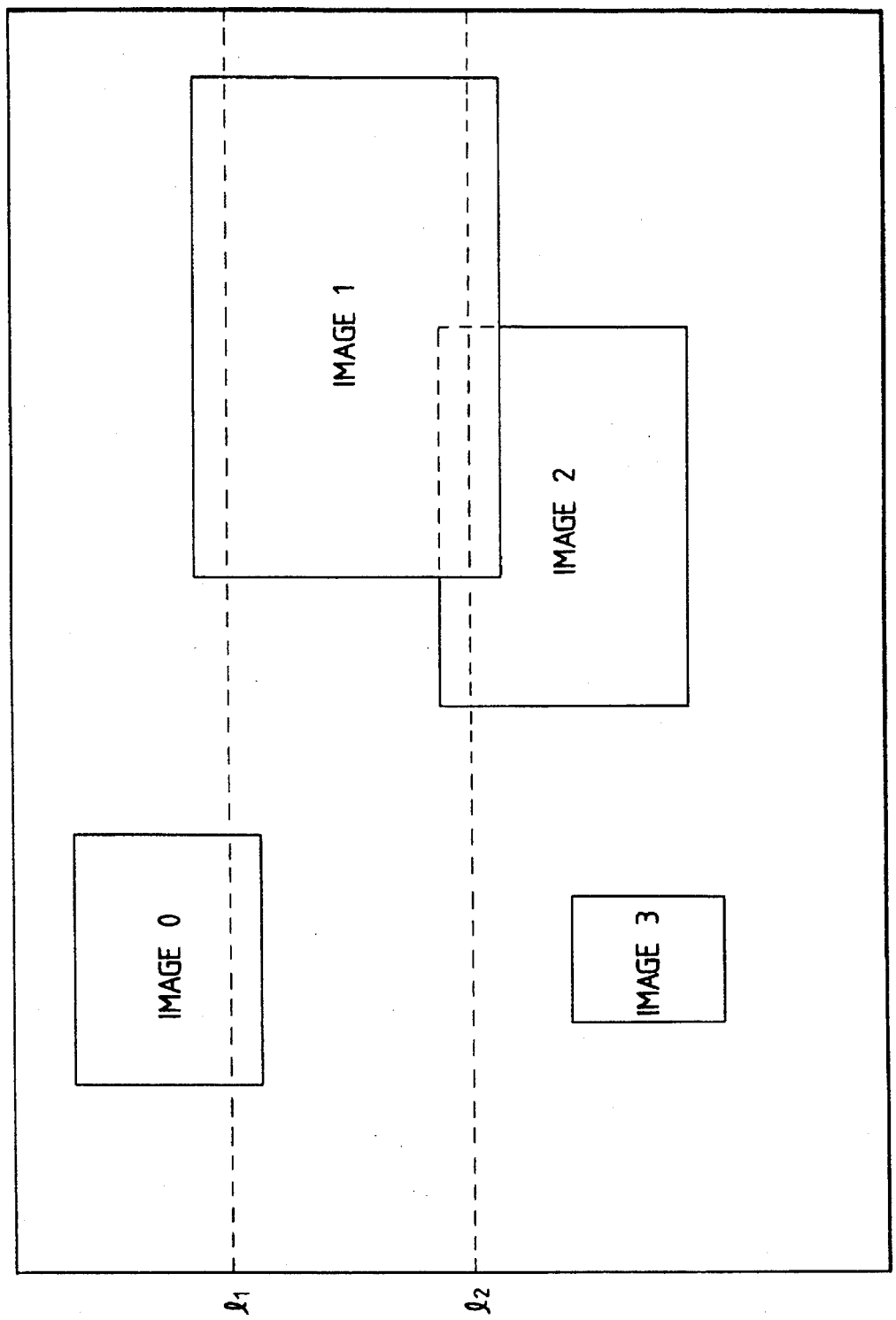
FIG. 20 is a view showing a state of an arbitrary layout of the image information shown in FIG. 19.

This layout will be exemplified such that "image 0" to "image 3" shown in FIG. 20 are developed as shown in FIG. 20 and are then formed.

Figure 19A:
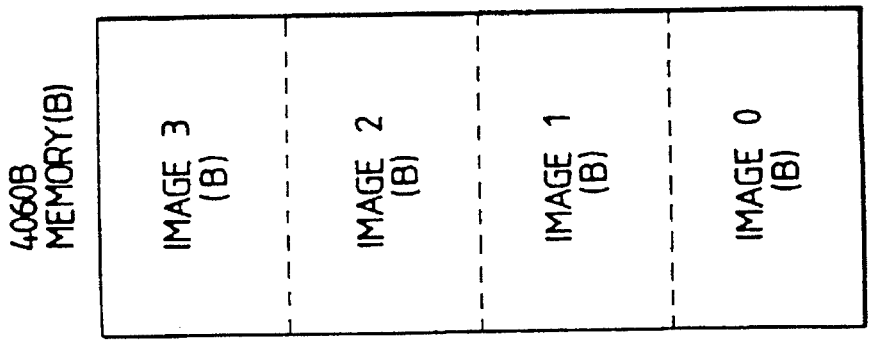
FIGS. 19A, 19B, and 19C are a view showing the layout of image information in a memory in another image recording device of this embodiment.
Figure 19B:
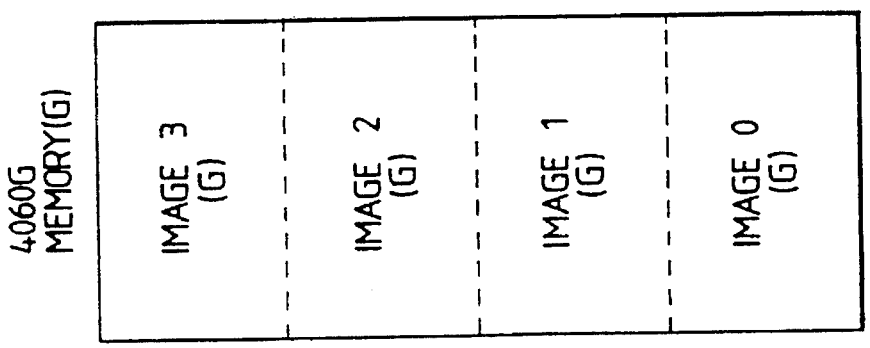
Figure 19C:
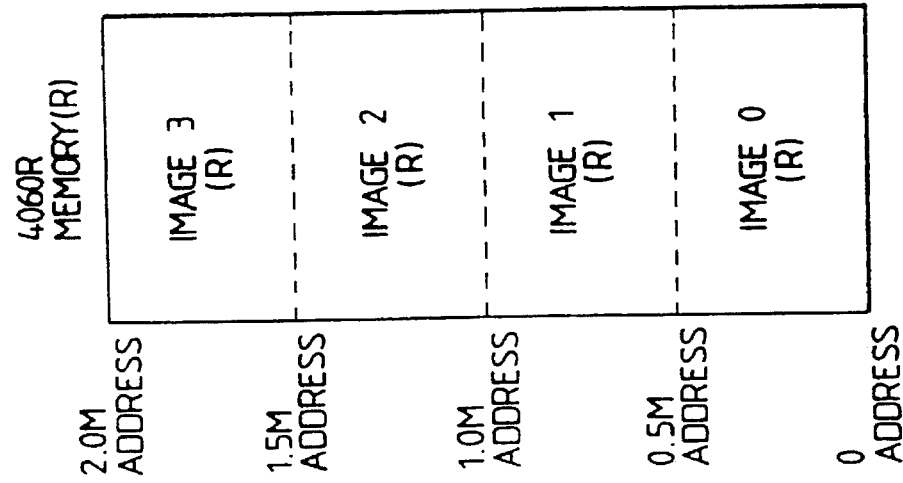

Under the same image input control of the memories as described above, four pieces of image information read from the color reader 1 are stored in the image memories 4060R, 4060G, and 4060B, as shown in FIG. 19. The operator depresses the entry key 429 in the digitizer 16 to cause a CPU to wait for receiving an input designating a position at which an image read from the digitizer 16 is formed.

The point pen 421 is operated to designate and input a desired developing position from the coordinate detection board 420.

The image forming process of this operation will be described with reference to the block diagrams of FIGS. 10A and 10B and timing charts of FIGS. 21 and 22.

Figure 21:
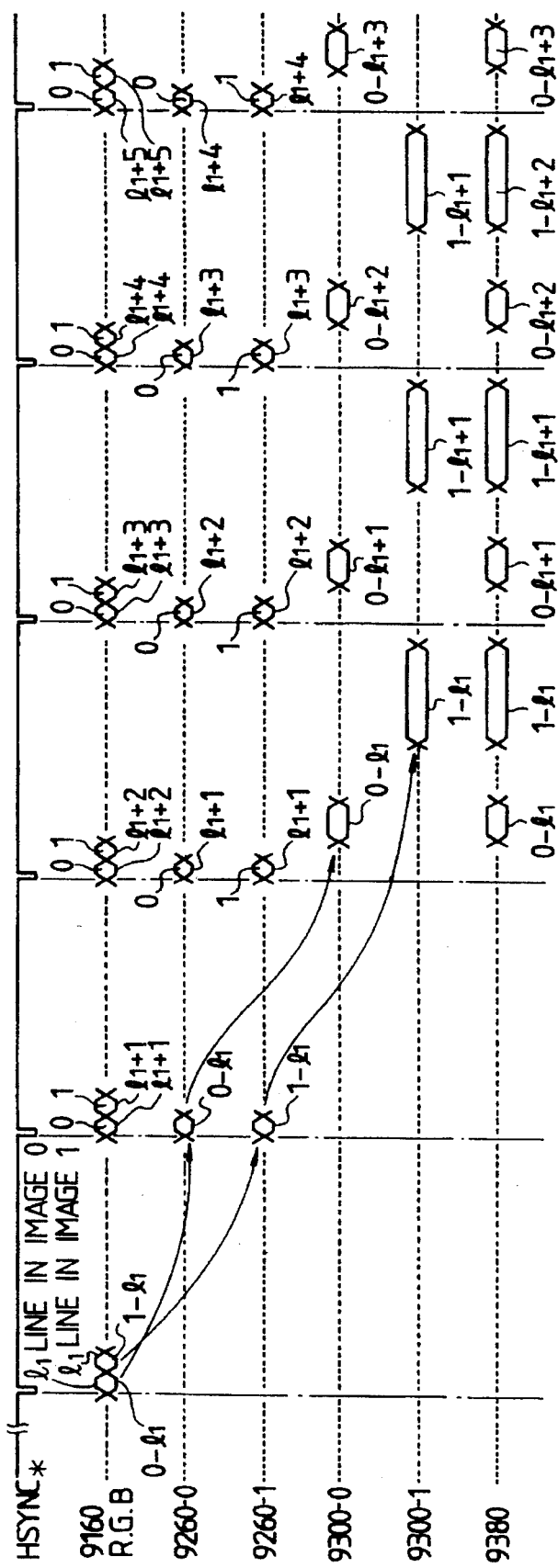
FIG. 21 a timing chart showing timings of image information in the "$l_1$" line shown in FIG. 21.
Figure 22:
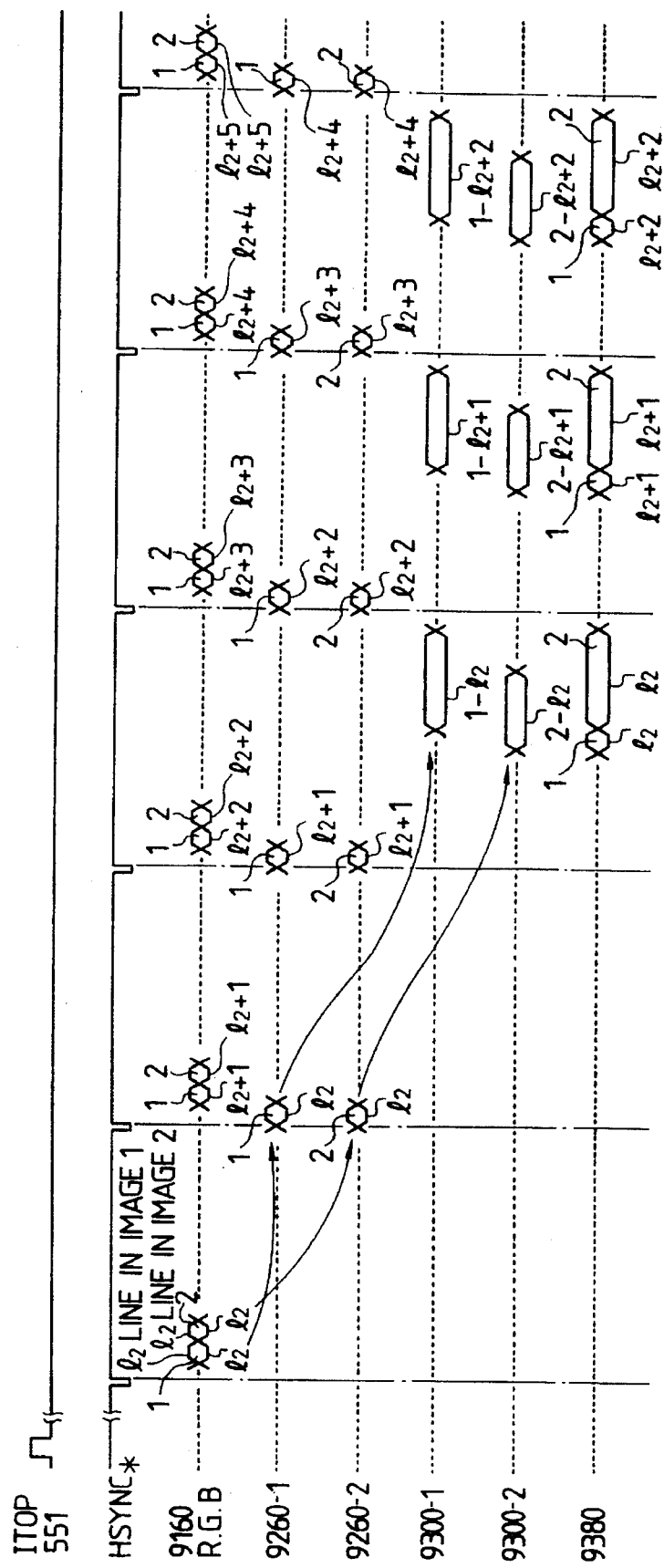
FIG. 22 is a timing chart showing timings of image information in the "$l_2$" shown in FIG. 21.

FIG. 21 is a timing chart of image formation on an "$l_1$" line shown in FIG. 20, and FIG. 22 is a timing chart of image formation on an "$l_2$" line shown in FIG. 20.

The ITOP signal 551 is output from the printer 2 in the same manner as described above, and the system controller 4210 starts its operation in synchronism with this signal.

In the layout of images shown in FIG. 20, "image 3" is obtained by rotating the image from the color reader 1 through 90°.

This image rotation processing is performed as follows. Images are transferred from the memories 4060R, 4060G, and 4060B to a work memory 4390 by a DMAC (Direct Memory Access Controller) 4380 in FIG. 10B. Known image rotation processing is performed in the work memory 4390 by the CPU 4360, and the images are transferred from the work memory 4390 to the memories 4060R, 4060G, and 4060B by the DMAC 4380 so that image rotation processing is performed.

Pieces of position information of the images laid out, designated, and input by the digitizer 16 are sent to the image recording device 3 through the video processing unit 12 shown in FIG. 1. Upon reception of these pieces of developing position information of the images, the system controller 4210 generates operation enable signals 9320-0 to 9320-3 for the expansion.interpolation circuits 4150-0 to 4150-3 corresponding to the respective images.

In the layout of arbitrary positions in this embodiment, for example, the counter 0 (4080-0), a counter 2 (4080-2), and a counter 3 (4080-3) are operated in correspondence with "image 1", "image 2", and "image 3" respectively.

Control of image formation on the "$l_1$" line shown in FIG. 20 will be described with reference to FIG. 21.

Data is read out from a storage area at the address "0" to the address "0.5M" (i.e., a storage area of "image 0" in FIG. 19) by the counter 0 (4080-0) to read out "image 0" from the image memories 4060R, 4060G, and 4060B. Outputs from the counters 4080-0 to 4080-3 are switched by the selector 4070.

Similarly, "image 1" is read out from a memory area at the address "0.5M" to the address "1M" by the counter 1 (4080-1). Timings of this read access are represented by 9160R, 9160G, and 9160B in FIG. 21.

The counters 4080-2 and 4080-3 are not operated in response to counter enable signals 9130-2 and 9130-3 from the system controller 4210.

Data of "image 0" and "image 1" are sent to the masking/black extraction/UCR circuit 4120 through the LUTs 4110R, 4110G, and 4110B, thus obtaining a surface sequential chrominance signal 9210. The surface sequential signal 9210 is converted into a parallel signal by the selector 4130, and the parallel signal is supplied to the FIFO memories 4140-0 and 4140-1 in units of pixels. When the operation enable signals 9320-0 and 9320-1 input from the system controller 4210 to the expansion.interpolation circuits 4150-0 and 4150-1 are enabled, the expansion.interpolation circuits 4150-0 and 4150-1 enable FIFO read signals 9280-0 and 9280-1 to start read control.

The FIFO memories 4140-0 and 4140-1 start transfer of image data to the expansion.interpolation circuits 4150-0 and 4150-1 in accordance with the signals 9280-0 and 9280-1. The expansion-interpolation circuits 4150-0 and 4150-1 perform layout and interpolation operations according to the area designated with the digitizer 16. The layout and interpolation operation timings are represented by 9300-0 and 9300-1 in FIG. 21.

Upon completion of layout and interpolation operations, "image 0" data and "image 1" data are selected by the selector 4190, and the selected data passes through the edge filter 4180 and is input to the LUTs 4200. The subsequent operations up to input to the connector 4550 are the same as those described above, and a detailed description thereof will be omitted.

The timing of the "$l_2$" shown in FIG. 20 will be described with reference to FIG. 22.

The operations associated with the image memories 4060R, 4060G, and 4060B to the expansion.interpolation circuits 4150-0 and 4150-1 are the same as described above.

On the "$l_2$" line, since "image 1" and "image 2" are output, the counter 1 (4080-1) and the counter 2 (4080-2), the FIFOs 4140-1 and 4140-2, and the expansion.interpolation circuits 4150-0 and 4150-1 are operated. These circuits are controlled in accordance with control signals from the system controller 4210.

As shown in FIG. 20, on the "$l_2$" line, "image 1" overlaps "image 2". In an overlapping portion, whether either image is formed or both images are formed can be selected in accordance with a control signal 9340 from the system controller 4210.

Detailed control is the same as that described above.

A signal from the connector 4550 is connected to the color reader 1 through a cable. For this reason, the video interface 101 in the color reader 1 selects and outputs an image signal 105 from the image recording device 3 to the printer interface 56 through a signal line shown in FIG. 5.

Figure 23:
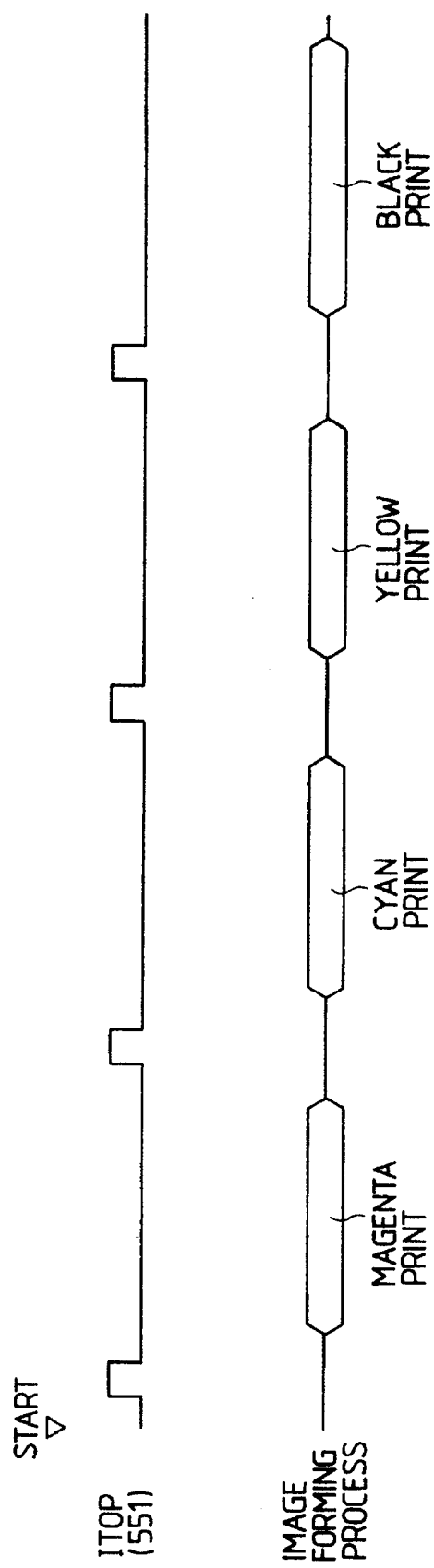
FIG. 23 is a timing chart showing timings of an image forming process of this embodiment.

FIG. 23 is a timing chart showing detailed transfer processing of image information from the image recording device 3 to the color printer 2 in the above-mentioned image formation.

As described above, upon depression of a start button of the operation panel 20, the printer 2 is started to start conveying a recording sheet. When the recording sheet reaches a front end of an image forming portion, the ITOP signal 551 is output. The ITOP signal 551 is sent to the image recording device 3 through the color reader 1. The image recording device 3 reads out image data stored in the image memories 4060R, 4060G, and 4060B under preset conditions, and the readout data are subjected to expansion and interpolation processing. The processed image data are sent to the video processing unit 12 in the color reader 1. The video interface 101 in the video processing unit 12 selects a processing method in the video interface 101 in accordance with the type of input data, i.e., (R,G,B) or (M,C,Y,BK).

In this embodiment, since the M, C, Y, and BK components are surface-sequentially output, the above operations are repeated four times in an order of M, C, Y, and BK, thereby forming a full-color image.

Description of Printer

As described above, an arrangement of the color printer 2 for printing out the image signal processed by the video processing unit 12 will be described with reference to FIG. 1.

In the arrangement of the printer 2 shown in FIG. 1, a scanner 711 includes a laser output unit for converting an image signal from the color reader 1 to an optical signal, a polygonal mirror 712 (comprising a polygon such as octagon), a motor (not shown) for rotating the polygonal mirror 712, and an f/θ lens (focusing lens) 713. A reflection mirror 714 changes an optical path of a laser beam emitted from the scanner 711 indicated by the alternate long and short dashed line. The printer 2 also includes a photosensitive drum 715.

A laser beam emitted from the laser output unit is reflected by the polygonal mirror 712 and scans the surface of the photosensitive drum 715 linearly (raster scan) through the f/θ lens 713 and the reflection mirror 714, thereby forming a latent image corresponding to an original image.

The printer 2 further includes a primary charger 717, an entire surface exposure lamp 718, a cleaner unit 723 for recovering a residual toner which is not transferred, and a pretransfer charger 724. These members are arranged around the photosensitive drum 715. A developing unit 726 develops the latent image formed on the surface of the photosensitive drum 715 upon laser exposure. Developing sleeves 713Y (yellow), 713M (magenta), 713C (cyan), and 713BK (black) are selectively brought into contact with the photosensitive drum 715 to directly develop the latent image. Toner hoppers 730Y, 730M, 730C, and 730BK store yellow, magenta, cyan, and black toners. A screw 732 transfers a developing member. The sleeves 713Y to 713BK, the toner hoppers 730Y to 730BK, and the screw 732 constitute the developing unit 726, and these members are arranged around a rotating shaft P of the developing unit 726.

For example, when an yellow toner image is to be formed, the latent image is developed with the yellow toner at the position illustrated in FIG. 1. When a magenta toner image is to be formed, the developing unit 726 is rotated about the shaft P to locate the developing sleeve 713M in the magenta developing unit to a position where it is brought into contact with the photosensitive drum 715.

A transfer drum 716 transfers a toner image formed on the photosensitive drum 715 to a recording sheet. A position sensor 719 detects movement of the transfer drum 716 to the home position when the position sensor 719 is caused to come close to an actuator plate 719 for detecting a movement position of the transfer drum 716. The printer 2 also includes a transfer drum cleaner 725, a paper press roller 727, a discharger 728, and a transfer charger 729. These members 719, 720, 725, and 727 are arranged around the transfer roller 716.

Sheets are collected in the paper feed cassettes 735 and 736. Paper pickup rollers 737 and 738 pick up the corresponding sheets from the cassettes 735 and 736. Timing rollers 739, 740, and 741 determine paper feed and convey timings. A sheet fed and conveyed through the above members is guided along a paper guide 749 and is wound around the transfer drum 716 while the leading end of the sheet is held by grippers (to be described later). The image forming process is then initiated.

A drum rotation motor 550 causes the photosensitive drum 715 and the transfer drum 716 to synchronously rotate. A separation ratchet 750 separates the sheet from the transfer drum 716 upon completion of the image forming process. A conveyor belt 742 conveys the separated sheet. An image fixing unit 743 fixes the sheet conveyed by the conveyor belt 742. In the image fixing unit 743, a rotational force of the motor 747 mounted on a motor mounting unit 748 is transmitted to a pair of heat press rollers 744 and 745 through a transmission gear 746, thereby fixing an image on a sheet conveyed between the heat press rollers 744 and 745.

Printout processing of the printer 2 having the above arrangement will be described with reference to a timing chart in FIG. 23.

When the first ITOP 551 is input, a Y latent image is formed on the photosensitive drum 715 with a laser beam and is developed by the developing unit 731Y. A toner image is then transferred to the transfer drum, and magenta printing is performed. The developing unit 726 is rotated about the shaft P.

When the next ITOP 551 is input, an M latent image is formed on the photosensitive drum with a laser beam. Cyan printing is performed by the same operations as described above. C and BK components corresponding to the next signals ITOP 551 are processed in the same manner as described above, so that yellow printing and black printing are sequentially performed. In this manner, when the image forming process is completed, the sheet is separated by a separation gripper 750, and image fixing is performed by the image fixing unit 743, thereby completing a series of color image printing operations.

Description of Monitor Television Interface

As shown in FIG. 1, the system of this embodiment can output contents of image memories in the image recording device to the monitor television 32. The system of this embodiment can also output a video image from the SV reproducing device 31.

This operation will be described in detail below.

Video image data stored in the image memories 4060R, 4060G, and 4060B are read out by the DMAC 4380. Video image data stored in the display memories 4410R, 4410G, and 4410B are sent to D/A converters 4430R, 4430G, and 4430B through the LUTs 4420R, 4420G, and 4420B and are converted into an analog R signal 4590R, an analog G signal 4590G, and an analog B signal 4590B in synchronism with a SYNC signal 4590S from a display controller 4440.

The display controller 4440 outputs a SYNC signal 9600 in synchronism with output timings of these analog signals. The analog R signal 4590R, the analog G signal 4590G, the analog B signal 4590B, and the SYNC signal 4590S are connected to the monitor television 4, and the storage contents of the image recording device 3 can be displayed.

In this embodiment, trimming of an image displayed on the display by sending a control command from the host computer 33 to the image recording device 3 can be performed.

Under the same control as described above, the CPU 4360 transfers only a valid area to the display memories 4410R, 4410G, and 4410B in accordance with area information designated and input by the host computer 33.

Furthermore, data are set in the comparators 4232 and 4233 shown in FIG. 12 in correspondence with the area designation information from the host computer 33 in the same manner as described above, and image data is input from the color reader 1 or the SV reproducing device 31 again, so that trimmed image data can be stored in the memories 4060R, 4060G, and 4060B.

A volume control 4400 is used to adjust color tones of a color image displayed on the monitor television 32.

The CPU 4360 reads a resistance value (preset value) of the volume control 4400 and sets output control correction data in the tables of the LUTs 4420R, 4420G, and 4420B. In order to match the display colors of the monitor television 4 with recording colors, the table control correction data in the LUTs 4200 are changed in synchronism with the preset value of the volume control 4400.

When a plurality of images are stored in the image memories 4060R, 4060G, and 4060B, the layout of the images to be recorded at the color printer 2 can also be performed by using the monitor television 32 and the host computer 33.

A size of a recording sheet is displayed on the monitor television 32, and layout position information of each image is input by the host computer 33 while the displayed image is being observed. An arbitrary layout of each image recorded at the color printer 2 can be performed.

Control for reading out storage information from the image memories 4060R, 4060G, and 4060B and control for recording this storage information at the printer 2 are the same as described above, and a detailed description thereof will be omitted.

Description of Computer Interface

In the system of this embodiment, as shown in FIG. 1, the host computer 33 is connected to the image recording device 3. An interface between the system of this embodiment and the host computer 33 will be described with reference to FIGS. 10A and 10B.

The system is interfaced with the host computer 33 through a GPZB controller 4310 connected to a connector 4580. The GPZB controller is connected to the CPU 4360 through the CPU bus 9610 to exchange commands with the host computer 33 and to perform image data transfer.

In the above embodiment, when an output from the SV reproducing device 31 is audio or digital information except for image information, data representing this is generated by the CPU 4360 and is stored in the memories 4060. Such data may be prestored in the work memory 4390 shown in FIG. 10B and may be accessed from the work memory 4390, thereby writing the readout data in the memories 4060.

The present invention is not limited to the above color image forming system, but is applicable to a monochromatic printer or the like, as a matter of course.

The printer of this embodiment comprises an electrophotographic printer. However, the present invention is not limited to this, but can be replaced with a heat transfer printer if the printer of this embodiment is an-ink-jet recording printer.

An arrangement of the SV reproducing device 31 in this embodiment may be described in, e.g., U. S. patent application Ser. No. 190,598. Note that the types of signals written on the disk in the apparatus of this prior art are an audio signal and a video signal. However, as shown in FIG. 16B, a waveform of a reproduced signal may be determined to determine a data signal. Alternatively, the type of ID signal in the reproduced signal is determined to generate each code signal shown in FIG. 16B.

A medium used in the reproducing device in this embodiment has a disk-like shape, but may be replaced with a card- or tape-like medium.

According to this embodiment, as has been described in detail, if information stored in the recording medium is image information, this image information is directly output. However, if the information stored in the recording medium is an audio or digital signal, image formation representing the content of this signal is formed, thereby preventing formation of a meaningless image for information except for image information. Therefore, confusion caused by a mixture of various types of information stored in the recording medium can be prevented. Therefore, effective utilization of the recording medium of this type can be enhanced.

We claim:

1. An image processing system comprising:

reproducing means for reproducing information stored in a medium;

discrimination means for discriminating whether the information reproduced by said reproducing means is image information having a particular attribution or another type of information having another type of attribution and different from said image information, said discrimination means discriminating whether the reproduced information is said image information having the particular attribution or audio information having the another type of attribution; and conversion means for converting data indicative of the another type of attribution of the audio information into image information when said discrimination means discriminates the information reproduced by said reproducing means is the audio information.

2. A system according to claim 1, wherein the medium comprises a disc type medium.

3. A system according to claim 1, wherein said discrimination means discriminates whether the reproduced information is image information or coded information.

4. A system according to claim 1, further comprising a visual image reproducing means for reproducing, as a visual image, the image information converted by said conversion means.

5. A system according to claim 3, wherein said visual image reproducing means comprises a printer.

6. A system according to claim 4, wherein said printer comprises an electronic-photography type printer.

7. A system according to claim 3, wherein said visual image reproducing means comprises a color printer.

8. An image processing system comprising:

reproducing means for reading information and attributions corresponding to said information and which are stored in a medium, said medium storing at least two different types of information, said at least two different types of information comprising image information with a corresponding attribution and audio information with another corresponding attribution;

an information producing means for producing predetermined image information; and an image forming means for forming, as a visual image, an image based on the information reproduced by said reproducing means when the attribution corresponding to the information reproduced by said reproducing means is said image information, and for forming, as a visual image, a predetermined image corresponding to the predetermined image information produced by said information producing means when the attribution corresponding to the information reproduced by said reproducing means is said audio information.

9. A system according to claim 8 wherein said reproducing means and said image forming means are separately provided.

10. A system according to any one of claims 4, 5, 6, 7, or 8, wherein said inputting means and said image forming means are separately provided.

11. A system according to claim 10, wherein said inputting means and said image forming means communicate with one another bi-directionally.

12. A system according to claim 9, wherein said reproducing means and said image forming means communicate with one another bi-directionally.

13. A system according to claim 8, wherein the medium comprises a disk type medium.

14. A system according to claim 8, wherein the attribution of the information reproduced by said reproducing means is image type information, audio type information, or digital type information.

15. A system according to claim 8, wherein the image information produced by said information producing means represents contents of attribution of the information reproduced by said reproducing means.

16. An image processing apparatus comprising:

inputting means for inputting an information signal with discrimination data identifying a type of the information signal;

discrimination means for determining from the discrimination data whether the information signal is an image signal or an audio signal; and producing means for producing an image signal representing that the information signal is the audio signal when said discrimination means determines that the information signal is the audio signal.

17. Apparatus according to claim 16, wherein said inputting means comprises a disc storage medium.

18. Apparatus according to any one of claims 16 or 17, wherein said discrimination means discriminates whether the information signal input by said inputting means comprises an image signal or a coded information signal.

19. An apparatus according to claim 18, wherein said producing means produces an image signal representing that the information signal is a coded information signal when said discrimination means determines that the information signal is the coded information signal.

20. An apparatus according to any one of claims 16, 17, or 19, further comprising image forming means for reproducing, as a visual image, the image signal produced by the producing means.

21. An apparatus according to any one of claims 16 or 17, further comprising an image forming means for reproducing, as a visual image, the information signal input by said inputting means when said discrimination means determines that the information signal is an image signal, and for reproducing, as a visual image, the image signal produced by the producing means when said discrimination means determines that the information signal input by said inputting means is an audio signal.

22. An apparatus according to claim 19, further comprising an image forming means for reproducing, as a visual image, the information signal input by said inputting means when said discrimination means determines that the information signal is an image signal, and for reproducing as a visual image, the image signal produced by said producing means when said discrimination means determines that the information signal input by the inputting means is a coded information signal.

23. An apparatus according to claim 20, wherein said image forming means comprises a printer.

24. An apparatus according to claim 21, wherein said image forming means comprises a printer.

25. An apparatus according to claim 22, wherein said image forming means comprises a printer.

26. An apparatus according to any one of claims 23, 24, or 25, wherein said printer comprises an electrophotographic type printer.

27. Apparatus according to claim 20, wherein said image forming means comprises a color printer.

28. Apparatus according to claim 21, wherein said image forming means comprises a color printer.

29. Apparatus according to claim 22, wherein said image forming means comprises a color printer.

30. An image processing method comprising the steps of:

inputting an information signal with discrimination data identifying a type of the information signal;

determining from the discrimination data whether the information signal is an image signal or an audio signal; and producing an image signal representing that the information signal is the audio signal when said discrimination step determines that the information signal is the audio signal.

31. A method according to claim 30, further comprising the step of printing the image signal produced by said producing step.

* * * * *

UNITED STATES PATENT AND TRADEMARK OFFICE
CERTIFICATE OF CORRECTION

PATENT NO. : 5,563,711
DATED : Oct. 8, 1996
INVENTOR(S) : Masanori Sakai, et al.

It is certified that error appears in the above-indentified patent and that said Letters Patent is hereby corrected as shown below:

On title page, item [56]
    line FPD, "61-023677 1/1987 Japan" should read --61-023677 1/1986 Japan--; and
    line USPD, "4,967,266 4/1990 Yamamoto" should read --4,967,266 10/1990 Yamamoto--.
Column 1,
    line 27, "not" (second occurrence) should be deleted.
Column 19,
    line 55, "claim 3," should read --claim 4,--;
    line 57, "claim 4," should read --claim 5,--; and
    line 60, "claim 3," should read --claim 4,--.
Column 20,
    line 16, "claim 8" should read --claim 8,--.

Signed and Sealed this

Twenty-fifth Day of February, 1997

Attest:

BRUCE LEHMAN

Attesting Officer    Commissioner of Patents and Trademarks